US012584036B2

(12) United States Patent
Yamada et al.

(10) Patent No.: US 12,584,036 B2
(45) Date of Patent: Mar. 24, 2026

(54) INK EJECTION DEVICE

(71) Applicant: Konica Minolta, Inc., Tokyo (JP)

(72) Inventors: Akihisa Yamada, Hino (JP); Yusaku Tanaka, Mitaka (JP); Ryoji Matsuda, Kunitachi (JP); Aeri Takeuchi, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 149 days.

(21) Appl. No.: 18/688,226

(22) PCT Filed: Sep. 16, 2021

(86) PCT No.: PCT/JP2021/034105
§ 371 (c)(1),
(2) Date: Feb. 29, 2024

(87) PCT Pub. No.: WO2023/042336
PCT Pub. Date: Mar. 23, 2023

(65) Prior Publication Data

US 2024/0384129 A1 Nov. 21, 2024

(51) Int. Cl.
*C09D 163/04* (2006.01)
*B41J 2/14* (2006.01)
(Continued)

(52) U.S. Cl.
CPC ........ *C09D 163/04* (2013.01); *B41J 2/14201* (2013.01); *C08G 59/245* (2013.01);
(Continued)

(58) Field of Classification Search
CPC ...... C09D 163/04; C09D 7/63; B41J 2/14201; B41J 2002/14306; B41J 2202/03;
(Continued)

(56) References Cited

FOREIGN PATENT DOCUMENTS

| | | | |
|---|---|---|---|
| JP | 2007269011 A | * | 10/2007 |
| JP | 2015-221541 A | | 12/2015 |
| JP | 2019-155792 A | | 9/2019 |

OTHER PUBLICATIONS

Kitani, Koji, "Liquid Discharge Head And Its Manufacturing Method" (JP 2007269011 A), Oct. 1, 20078, [Best Mode and Mode for Invention] (Year: 2007).*

(Continued)

*Primary Examiner* — Lisa Solomon
(74) *Attorney, Agent, or Firm* — LUCAS & MERCANTI, LLP

(57) ABSTRACT

An ink ejection device includes a base material, a resin layer having at least one principal surface laminated to the base material to be in contact with the base material, and an ink flow path disposed such that an ink contacts and circulates in a part of the resin layer, wherein the resin layer contains carbon, oxygen, nitrogen and silicon, and at least one of the principal surfaces satisfies the following requirements (1) and (2). (1) the principal surface is in contact with the base material. (2) the relation of the atomic concentration (atm %) of nitrogen, oxygen and silicon in the principal surface of the resin layer and the interior thereof measured by X-ray photoelectron spectroscopy is represented by the principal surface O>the interior O, and the principal surface N>0, and the principal surface Si/the interior Si is 5 or more.

10 Claims, 10 Drawing Sheets

(51) Int. Cl.
*C08G 59/24* (2006.01)
*C08K 5/544* (2006.01)
*C09D 7/63* (2018.01)

(52) U.S. Cl.
CPC ................ *C08K 5/544* (2013.01); *C09D 7/63* (2018.01); *B41J 2002/14306* (2013.01)

(58) Field of Classification Search
CPC .. B41J 2/14209; B41J 2/14233; B41J 2/1609; B41J 2/161; B41J 2/1626; B41J 2/1642; B41J 2/1646; B41J 2002/14362; B41J 2002/14403; B41J 2002/14491; B41J 2202/12; B41J 2202/18; B41J 2/1623; C08G 59/245; C08K 5/544
See application file for complete search history.

(56) References Cited

OTHER PUBLICATIONS

International Search Report issued for the corresponding International patent application No. PCT/JP2021/034105, mailed Dec. 7, 2021, with English translation, 5 pages.
The International Bureau of WIPO, "The International Preliminary Report on Patentability" for the corresponding International Application No. PCT/JP2021/034105, mailed Dec. 7, 2021, with English translation, 8 pages.

* cited by examiner

INK EJECTION DEVICE

CROSS REFERENCE TO RELATED APPLICATION

This Application is a 371 of PCT/JP2021/034105 filed on Sep. 16, 2021, the contents of which are incorporated herein by reference.

TECHNICAL FIELD

The present invention relates to an ink ejection device. More specifically, the present invention relates to an ink ejection device with long-term reliability because of an excellent ink resistance at the interface between a resin layer disposed between base materials or on a base material, and the base material.

BACKGROUND ART

Recently, an ink with a composition that contains less water and an increased amount of a solvent for suppressing curling of a printed matter at the time of printing on a paper medium, and an ink containing a large amount of solvent that is soluble in water and highly soluble in a resin such as methyl pyrrolidone or γ-butyl lactone for improving the printing property on a non-absorbent film medium have been developed. Since these inks are an aqueous ink with water and have strong organic solvent properties, they have increased permeability to a resin layer such as an adhesive layer and a protective layer included in an ink ejection device.

Therefore, when the ink is used for an ink ejection device with a conventional aqueous ink, the ink easily penetrates to the resin layer, and the ink also easily penetrates to the interface between the base material and the resin layer. In particular, when a resin layer is formed on or between base materials made of a hydrophilic material such as a metal or a metal oxide, the ink penetrates to the interface between the base material and the resin layer more easily, and the adhesive strength between the base material and the resin layer is significantly reduced.

In order to solve the above problems, for example, Patent Document 1 discloses a liquid ejection head having a flow path comprising a first member, a resin layer, and a second member, wherein the resin layer contains a cured product of a resin composition containing an epoxy compound, a polythiol compound having two or more thiol groups in the molecule, and an imidazole compound. In Patent Document 1, it is described that the resin layer has high organic solvent resistance and can be cured at a low temperature, and that the liquid ejection head comprising the resin layer has excellent initial adhesiveness and adhesion reliability.

In addition, Patent Document 2 discloses a formulation that cures at a low temperature (60° C., 80° C.) and has high adhesion, for a resin layer that joins a vibrating means for applying pressure to a pressure generating chamber to a flow path forming part in a liquid ejection head having the flow path forming part in which pressure generating chambers are arranged in a row. Specifically, a resin layer formed from an epoxy resin, a polythiol compound, a particular adhesion-imparting compound, and a curable resin composition containing a curing accelerator is described.

However, the resin layer in the liquid ejection head described in these documents may have insufficient adhesiveness at the interface between the base material such as a flow path forming part and the resin layer, depending on the type of ink to be used.

CITATION LIST

Patent Literature

[Patent Document 1] JP 2015-221541 A
[Patent Document 2] JP 2019-155792 A

SUMMARY OF THE INVENTION

Problem to be Solved by the Invention

The present invention has been made in view of the above-described problems and circumstances, and an object of the present invention is to provide an ink ejection device with long-term reliability because of an excellent ink resistance at the interface between a resin layer disposed between base materials or on a base material, and the base material.

Means for Solving the Problem

In order to solve the above problems, the present inventors have found that, in the process of studying the causes and the like of the above problems, by making a resin layer have a specific configuration in an ink ejection device comprising a base material, a resin layer having at least one principal surface laminated to the base material to be in contact with the base material, and an ink flow path disposed such that an ink flows in contact with a part of the resin layer, the interface between a resin layer disposed between base materials or on a base material, and the base material has excellent ink resistance, and thus the ink ejection device with long-term reliability is obtained, and reached the present invention. That is, the above-described problems according to the present invention are solved by the following means.

1. An ink ejection device comprising a base material, a resin layer having at least one principal surface laminated to the base material to be in contact with the base material, and an ink flow path disposed such that an ink flows in contact with a part of the resin layer, wherein the resin layer contains carbon, oxygen, nitrogen and silicon, and at least one of the principal surfaces satisfies the following requirements (1) and (2).

(1) the principal surface is in contact with the base material.

(2) if the atomic concentration (atm %) of nitrogen, oxygen and silicon in the principal surface of the resin layer measured by X-ray photoelectron spectroscopy is represented by the principal surface N, the principal surface O and the principal surface Si, and the atomic concentration (atm %) of nitrogen, oxygen and silicon in the interior of the resin layer is represented by the interior N, the interior O and the interior Si, the principal surface O>the interior O and the principal surface N>0, and the ratio of the principal surface Si to the interior Si represented by the principal surface Si/the interior Si is 5 or more.

2. The ink ejection device according to item 1, wherein the principal surface satisfying the requirements (1) and (2) further satisfies the requirements (3).

(3) the ratio of the principal surface N to the interior N represented by the principal surface N/the interior N is 1.5 or more.

3. The ink ejection device according to item 1 or 2, wherein a spectrum obtained by analyzing the binding state of nitrogen atoms by X-ray photoelectron spectroscopy on the principal surface satisfying the requirements (1) and (2) has a peak of $—NH_2$ or $—NH_3^+$.

4. The ink ejection device according to any one of items 1 to 3, wherein the resin layer is a cured product of a resin composition containing an epoxy compound, a curing agent having a pKa of a $H^+$ adduct at 25° C. of 3 or more, and an amino-based silane coupling agent.

5. The ink ejection device according to item 4, wherein the curing agent is a nitrogen-containing catalytic curing agent.

6. The ink ejection device according to item 4 or 5, wherein the content of the curing agent relative to the total amount of the resin composition is in the range of 3 to 15% by mass.

7. The ink ejection device according to any one of items 4 to 6, wherein a molecular weight per one nitrogen atom of the amino-based silane coupling agent is 250 or less.

8. The ink ejection device according to any one of items 4 to 7, wherein the amino-based silane coupling agent has 2 or more alkoxy groups bound to silicon atoms.

9. The ink ejection device according to any one of items 1 to 8, wherein a material constituting the base material which is in contact with the principal surface satisfying the requirements (1) and (2) contains a metal, a metal oxide, or a glass.

10. The ink ejection device according to any one of items 1 to 9, wherein the ink contains a compound having at least one kind of groups selected from a carboxylic acid group, a sulfonic acid group and a phosphonic acid group, or at least one kind of anions selected from $SO_4^{2-}$, $PO_4^{3-}$, $B(C_6F_5)_4^-$, $SbF_6^-$, $PF_6^-$, $BF_4^-$, $CF_3SO_3^-$ and $C_4F_9SO_3^-$.

Effect of the Invention

According to the above means of the present invention, it is possible to provide an ink ejection device with long-term reliability because of an excellent ink resistance at the interface between a resin layer disposed between base materials or on a base material, and the base material. The expression mechanism or the action mechanism of the effect of the present invention is presumed as follows.

The ink ejection device of the present invention is an ink ejection device comprising a base material, a resin layer having at least one principal surface laminated to the base material to be in contact with the base material, and an ink flow path disposed such that an ink flows in contact with a part of the resin layer, wherein the resin layer has the following features.

The resin layer contains carbon, oxygen, nitrogen and silicon. At least one of the principal surfaces satisfies the requirements (1) and (2) described above.

The resin layer included in the ink ejection device of the present invention may have, for example, a configuration in which only one principal surface of the resin layer is in contact with a base material (hereinafter, also referred to as a "configuration having a resin layer on a base material"), and a configuration in which a resin layer is sandwiched between two base materials and both principal surfaces of the resin layer are in contact with the respective base materials (hereinafter, also referred to as a "configuration having a resin layer between base materials"). In the case of a configuration having a resin layer on a base material, the resin layer has, for example, a configuration in which the principal surface opposite to the one in contact with the base material contacts an ink flow path. In the case of a configuration having a resin layer between base materials, the resin layer has, for example, a configuration in which the side surface is in contact with an ink flow path.

In the ink ejection device of the present invention, in the case of a configuration having a resin layer on a base material, the above requirement (2) is satisfied in the principal surface of the base material side, and in the case of a configuration having a resin layer between base materials, the above requirement (2) is satisfied in at least one principal surface in contact with the base material. The requirement (2) is composed of three requirements: (2-1) the principal surface O>the interior O, (2-2) the principal surface N>0, and (2-3) the principal surface Si/the interior Si≥5. In the present invention, the indices used in (2-1) to (2-3) described above are used as indices indicating the presence of a chemical bond, a group that traps ink components, or the like at the interface between a base material and a resin layer.

Specifically, when a resin layer is formed on a base material as a cured product of the resin composition, a base material and a resin layer are chemically bound to each other by reacting the reactive groups on the surface of the base material with the components in the resin composition, thereby strong adhesiveness can be imparted. When a resin layer is formed so as to be sandwiched between base materials, the above chemical bond is formed at the surface where at least one or both of the two base materials are in contact with the resin layer, thereby improving the ink resistance in the adhesiveness as a resin layer that adheres between base materials.

In the present invention, as an index of the amount of chemical bond, a "base material-O—Si" bond (covalent bond) was assumed, and the requirements (2-1) and (2-3) were set. When a reactive group on the surface of a base material is an OH group and the resin composition contains a compound having a hydrolyzable silyl group, first, the hydrolyzable silyl group undergoes a hydrolysis reaction to form a silanol group (Si—OH), and the silanol group undergoes a dehydration condensation reaction with an OH group (base material-OH) on the surface of a base material to form a chemical bond (base material-O—Si). Therefore, it was defined that if the requirements (2-1) and (2-3) are satisfied, in the case of a configuration having a resin layer on a base material, the "—O—Si" bond bound to a base material is present in an amount enough to enhance the adhesiveness between a base material and a resin layer in the principal surface of the base material side, and in the case of a configuration having a resin layer between base materials, the "—O—Si" bond bound to a base material is present in an amount enough to enhance the adhesiveness between a base material and a resin layer in at least one principal surface in contact with the base material.

In the present invention, the requirement (2-2) was set based on the assumption that in the case of a configuration having a resin layer on an base material, when a nitrogen atom is further present on the principal surface of the base material side, and in the case of a configuration having a resin layer between base materials, when a nitrogen atom is further present on at least one principal surface in contact with a base material, ink components can be trapped at the interface between the principal surface of a resin layer and a base material.

When a nitrogen atom is present on the principal surface as a primary amino group ($—NH_2$), for example, the nitrogen atom is charged to trap ink components such as water and acid, thereby preventing penetration of ink to the interface between a resin layer and a base material and improving the ink resistance of the constituent material. When a nitrogen atom is present, for example, as a primary amino group (—$NH_2$), the nitrogen atom may hydrogen bind with an OH group on the surface of a base material to form a base material-$O^-$—$NH_3^+$ group. Although water and acid cannot be trapped by —$NH_3^+$ group involved in hydrogen binding with a surface of a base material, the hydrogen binding can be easily broken, so that it becomes —$NH_2$ and can contribute to trap water and acid entering from the outside.

In the present invention, a relation of the content of specific atomic species in the principal surface and the interior of the resin layer in contact with a base material is defined using the above indices in this manner, thereby improving the ink resistance in the interface between a resin layer disposed between base materials or on a base material, and the base material. According to the present invention, it is thereby possible to provide an ink ejection device with long-term reliability.

MODE FOR CARRYING OUT THE INVENTION

Figure 1:
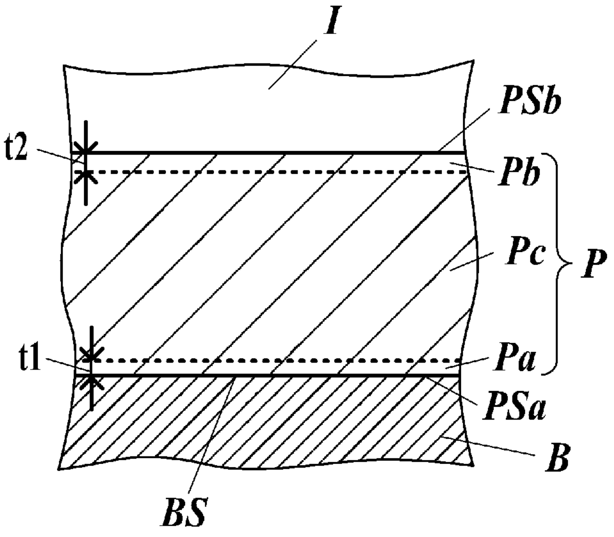
FIG. 1 This is a cross-sectional view schematically showing a peripheral part of a resin layer when only one principal surface of a resin layer is in contact with a base material.

The ink ejection device of the present invention is an ink ejection device comprising a base material, a resin layer having at least one principal surface laminated to the base material to be in contact with the base material, and an ink flow path disposed such that an ink flows in contact with a part of the resin layer, wherein the resin layer contains carbon, oxygen, nitrogen, and silicon, and at least one of the principal surfaces satisfies the following requirements (1) and (2).

(1) the principal surface is in contact with the base material.

(2) if the atomic concentration (atm %) of nitrogen, oxygen and silicon in the principal surface of the resin layer measured by X-ray photoelectron spectroscopy is represented by the principal surface N, the principal surface O and the principal surface Si, and the atomic concentration (atm %) of nitrogen, oxygen and silicon in the interior of the resin layer is represented by the interior N, the interior O and the interior Si, the principal surface O>the interior O and the principal surface N>0, and the ratio of the principal surface Si to the interior Si represented by the principal surface Si/the interior Si is 5 or more.

This feature is a technical feature common to or corresponding to the respective embodiments.

As an embodiment of the present invention, it is preferable that the principal surface satisfying the requirements (1) and (2) further satisfy the requirement (3): "the ratio of the principal surface N to the interior N represented by the principal surface N/the interior N is 1.5 or more". This further improves the effectiveness of trapping 40 ink components at the interface between the principal surface of a resin layer and a base material, from the viewpoint that the effects of the present invention can be further exhibited.

As an embodiment of the present invention, it is preferable that a spectrum obtained by analyzing the binding state of nitrogen atoms by X-ray photoelectron spectroscopy on the principal surface satisfying the requirements (1) and (2) has a peak of —$NH_2$ or —$NH_3^+$. The spectrum may be a spectrum having a peak of —$NH_2$ and no peak of —$NH_3^+$, a spectrum having no peak of —$NH_2$ and a peak of —$NH_3^+$, or a spectrum having both a peak of —$NH_2$ and a peak of —$NH_3^+$, from the viewpoint that the effects of the present invention can be further exhibited. In the principal plane, a spectrum having both a peak of —$NH_2$ and a peak of —$NH_3^+$ is typically obtained.

The —$NH_3$+ present on the principal surface satisfying the requirements (1) and (2) above is considered to be hydrogen bound to an OH group on the surface of a base material as described above. When the OH group on the surface of a base material is consumed for hydrogen binding with —$NH_2$, the hydrolyzable silyl group cannot bind to the surface of a base material in the area. In the state of —$NH_2$, water and acid entering from the outside can be trapped, but in the state of —$NH_3^+$, water and acid cannot be trapped unless the hydrogen-binding with the surface of a base material is broken. However, it is preferable that the nitrogen atom present in the principal surface satisfying the requirements (1) and (2) is present as —$NH_2$ or —$NH_3^+$ because —$NH_3^+$ can become —$NH_2$ easily.

As an embodiment of the present invention, it is preferable that the resin layer is a cured product of a resin composition containing an epoxy compound, a curing agent having a pKa of $H^+$ adduct at 25° C. of 3 or more, and an amino-based silane coupling agent, from the viewpoint that the effects of the present invention can be further exhibited.

As an embodiment of the present invention, it is preferable that the curing agent is a nitrogen-containing catalytic curing agent, from the viewpoint that the effects of the present invention can be further exhibited.

As an embodiment of the present invention, it is preferable that the content of the curing agent relative to the total amount of the resin composition is in the range of 3 to 15% by mass, from the viewpoint that the effects of the present invention can be further exhibited.

As an embodiment of the present invention, it is preferable that a molecular weight per one nitrogen atom of the amino-based silane coupling agent is 250 or less, from the viewpoint that the effects of the present invention can be further exhibited.

As an embodiment of the present invention, it is preferable that the amino-based silane coupling agent has 2 or more alkoxy groups bonded to silicon atoms, from the viewpoint that the effects of the present invention can be further exhibited.

As an embodiment of the present invention, when a material constituting the base material which is in contact with the principal surface satisfying the requirements (1) and (2) includes a metal, a metal oxide, or a glass, a more remarkable effect can be obtained.

As an embodiment of the present invention, when the ink contains a compound having at least one kind of groups selected from a carboxylic acid group, a sulfonic acid group and a phosphonic acid group, or at least one kind of anions selected from $SO_4^{2-}$, $PO_4^{3-}$, $B(C_6F_5)_4^-$, $SbF_6^-$, $PF_6^-$, $BF_4^-$, $CF_3SO_3^-$ and $C_4F_9SO_3^-$, a more remarkable effect can be obtained.

Hereinafter, the present invention, its constituent elements, and embodiments and aspects for carrying out the present invention will be described in detail. In the present application, "to" is used in the meaning that numerical values described before and after are included as a lower limit value and an upper limit value.

Ink Ejection Device

The ink ejection device of the present invention is an ink ejection device comprising a base material, a resin layer having at least one principal surface laminated to the base material to be in contact with the base material, and an ink flow path disposed such that an ink flows in contact with a part of the resin layer, wherein the resin layer contains carbon, oxygen, nitrogen and silicon, and at least one of the principal surfaces satisfies the following requirements (1) and (2).

(1) The principal surface is in contact with the base material.

(2) If the atomic concentration (atm %) of nitrogen, oxygen and silicon in the principal surface of the resin layer measured by X-ray photoelectron spectroscopy is represented by the principal surface N, the principal surface O and the principal surface Si, and the atomic concentration (atm %) of nitrogen, oxygen and silicon in the interior of the resin layer is represented by the interior N, the interior O and the interior Si, the principal surface O>the interior O and the principal surface N>0, and the ratio of the principal surface Si to the interior Si represented by the principal surface Si/the interior Si is 5 or more.

Hereinafter, the principal surface satisfying the requirements (1) and (2) is also referred to as an "adhesive principal surface (X)". In the present invention, the principal surface N, the principal surface O, and the principal surface Si, and the interior N, the interior O, and the interior Si of a resin layer in the adhesive principal surface (X) are measured using a X-ray photoelectron spectroscopy (XPS).

Figure 2:
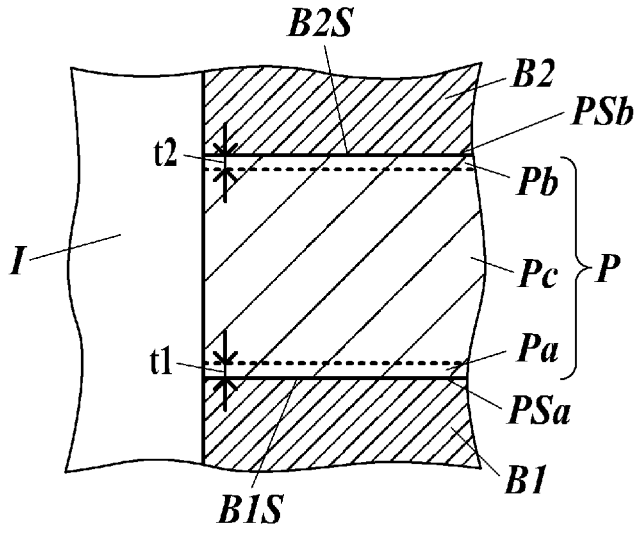
FIG. 2 This is a cross-sectional view schematically showing a peripheral part of a resin layer when both principal surfaces of a resin layer are in contact with a base material.

The positional relation between a base material and a resin layer and an ink flow path, and the configuration of the surface and the interior of a resin layer, included in an ink ejection device of the present invention will be described with reference to FIGS. 1 and 2. FIG. 1 is a cross-sectional view schematically showing a peripheral part of a resin layer when only one principal surface of a resin layer is in contact with a base material, in particular, when a resin layer is disposed on a base material and an ink flow path is provided on the resin layer. FIG. 2 is a cross-sectional view schematically showing a peripheral part of a resin layer when both principal surfaces of a resin layer are in contact with a base material, in particular, when a resin layer is disposed between base materials and an ink flow path is provided so as to be in contact with the side surfaces of a base material and a resin layer.

In FIG. 1, a resin layer P is formed on a surface BS of a base material B. The resin layer P has a first principal surface PSa and a second principal surface PSb, and the first principal surface PSa is in contact with the surface BS. The second principal surface PSb faces an ink flow path I through which ink flows. Examples of the resin layer having the above-described configuration include a protective layer. The resin layer P is composed of a first surface layer part Pa consisting of an area from the first principal surface PSa as a starting point to a depth of t1[nm], a second surface layer part Pb consisting of an area from the second principal surface PSb as a starting point to a depth of t2[nm], and the interior Pc consisting of an area other than the first surface layer part Pa and the second surface layer part Pb. In the resin layer P shown in FIG. 1, the above requirement (2) is satisfied in the relation between the first principal surface PSa and the interior Pc. That is, only the first principal surface PSa is an adhesive principal surface (X).

A resin layer having an adhesive principal surface (X) formed on a base material similar to that shown in FIG. 1 is shown as a protective film 4 in FIG. 7 and FIG. 8 described later, for example, as an example of a specific member in an ink ejection device.

In FIG. 2, a resin layer P is formed between a base material B1 and a base material B2. The resin layer P has a first principal surface PSa and a second principal surface PSb, and a surface B1S of the base material B1 is in contact with the first principal surface PSa, and a surface B2S of the base material B2 is in contact with the second principal surface PSb. The side of the resin layer P faces an ink flow path I through which ink flows. Examples of the resin layer having the above-described configuration include an adhesive layer.

A resin layer P is composed of a first surface layer part Pa consisting of an area from the first principal surface PSa as a starting point to a depth of t1[nm], a second surface layer part Pb consisting of an area from the second principal surface PSb as a starting point to a depth of t2[nm], and the interior Pc consisting of an area other than the surface layer parts Pa and Pb. In the resin layer P shown in FIG. 2, the above requirement (2) is satisfied in the relation between the first principal surface PSa and the interior Pc or the relation between the second principal surface PSb and the interior Pc. The above requirement (2) may be satisfied in both the relation between the first principal surface PSa and the interior Pc and the relation between the second principal surface PSb and the interior Pc. That is, either one of the first principal surface PSa and the second principal surface PSb may be an adhesive principal surface (X), or both may be an adhesive principal surface (X).

A resin layer having an adhesive principal surface (X) formed between base materials similar to that shown in FIG. 2 is shown as an adhesive layer 2 in FIGS. 7 and 8 described later and as an adhesive layer 2A in FIGS. 9 and 10, for example, as an example of a specific member in an ink ejection device.

The principal surface N, the principal surface O and the principal surface Si, and the interior N, the interior O and the interior Si of a resin layer in the adhesive principal surface (X) can be measured by XPS as follows, for example.

The measurement of the atomic concentration (atm %) of the various elements in the layered sample by XPS is performed sequentially by measuring the energy of the photoelectrons generated by irradiating the exposed surface with X-rays at predetermined etching intervals while performing etching from the principal surface of the sample toward the thickness direction by ion sputtering. As a result, an atomic concentration (atm %) distribution curve (hereinafter, referred to as "depth profile") of various elements from the principal surface of the sample toward the thickness direction is obtained. In the analyses by XPS, since H and He cannot be detected, the atomic concentration (atm %) of the present invention indicates the atomic concentration (atm %) of the elements in all elements except H and He.

In a resin layer P shown in FIG. 1, by measuring the atomic composition by XPS from the first principal surface PSa toward the interior Pc to create a depth profile, it can be confirmed that the requirement (2) is satisfied. Here, the first principal surface PSa is a principal surface in contact with a base material B. Therefore, in order to measure the principal surface N, the principal surface O, and the principal surface Si by using XPS, a resin layer P is separated from a base material B, the measurement by XPS is performed on the separated first principal surface PSa, and further a depth profile of the thickness direction is created.

The depth profile of a resin layer P thus obtained typically has a patterning in which the atomic composition changes in the thickness direction in an area from the first surface layer part Pa, that is, the first principal surface PSa to a depth of t1[nm], and the atomic composition becomes constant in the thickness direction in an interior Pc having a depth equal to or greater than the depth of t1[nm] from the first principal surface PSa. In the present invention, the interior of the resin layer is defined as an area where the atomic composition becomes constant in the thickness direction in the depth profile of the resin layer by XPS.

In a resin layer P shown in FIG. 1, for example, the atomic composition of the interior Pc and the atomic composition of the first principal surface PSa from a second principal surface PSb, which is a principal surface not in contact with a base material, can also be measured. That is, the atomic composition is measured by XPS from the second principal surface PSb toward the interior Pc to create a depth profile, the area where the atomic composition is constant in the thickness direction is the interior Pc, and the atomic composition in the area can be the atomic composition of the interior Pc. In addition, since an interface between the first principal surface PSa of a resin layer P and the surface BS of a base material B is clear in the depth profile, the atomic composition of the interface can be the atomic composition of the first principal surface PSa of a resin layer P.

An adhesive principal surface (X) in a resin layer P shown in FIG. 2 is the first principal surface PSa and/or the second principal surface PSb, and the atomic composition of the adhesive principal surface (X) and the atomic composition of the interior Pc can be measured in the same manner as the first principal surface PSa in a resin layer P shown in FIG. 1.

The distribution curve obtained by the XPS depth profile measurement can be created, for example, with the vertical axis being the concentration (units: atm %) of the respective elements and the horizontal axis being the etching time (sputtering time). In the atomic concentration distribution curve in which the horizontal axis is the etching time as described above, the etching time is roughly correlated with the distance (depth) from the principal surface of a resin layer in the thickness direction. The distance (depth) in the thickness direction from the principal surface of a resin layer to the measurement position can be calculated from the relation between the etching rate and the etching time employed in the XPS depth profile measurement.

Further, as a sputtering method employed in the XPS depth profile measurement, a noble gas ion sputtering method using argon (Ar) as the etching ion species can be employed. The etching rate can be measured with $SiO_2$ thermal oxidation film whose film thickness is known in advance, and the etching depth is often expressed in terms of $SiO_2$ thermal oxidation film equivalent value.

In the present invention, the atomic concentration (atm %) of the various elements, the principal surface N, the principal surface O, and the principal surface Si in the adhesive principal surface (X) of a resin layer are measured values of the first time (depth of 0 nm) before the start of the etching when the XPS depth profile measurement is performed from the adhesive principal surface (X) side. The adhesive principal surface (X) of a resin layer can be obtained as a separation surface of a resin layer side when a base material with a resin layer is separated at the interface between the base material and the resin layer using, for example, a cutter-knife.

Further, for example, when the XPS depth profile measurement is performed from the side opposite to the adhesive principal surface (X) of a resin layer, the measured values of the atomic concentration (atm %) of the various elements at the interface with a base material are the principal surface N, the principal surface O, and the principal surface Si on the adhesive principal surface (X). In addition, when the XPS depth profile measurement is performed from the side opposite to the adhesive principal surface (X) of a resin layer, according to the thickness of the resin layer, the resin layer is shaved off from the opposite side of the adhesive principal surface (X) in advance until the remaining resin layer has an appropriate thickness, preferably of about 0.1 to 1 μm, then the XPS depth profile measurement can be performed effectively. In this case, the interior N, the interior O and the interior Si can be measured in the initial part of the measurement.

The interface between a resin layer and a base material can be identified based on the atomic concentration (atm %) of carbon in the resin layer and the base material, for example, when the base material is made of an inorganic material such as metal, metal oxide, or glass. For example, a range from the position where the atomic concentration (atm %) of carbon with respect to the atomic concentration (atm %) of carbon in the interior of a resin layer is 0.82 (starting point) to the position of detection limit (end point) can be identified as the interface between a resin layer and a base material (the adhesive principal surface (X) of a resin layer and the surface of a base material). The starting point may be appropriately selected from a range from the position where the atomic concentration (atm %) of carbon with respect to the atomic concentration (atm %) of carbon in the interior of a resin layer becomes 0.82 to the position where the atomic concentration (atm %) of carbon with respect to the atomic concentration (atm %) of carbon in the interior of a resin layer becomes 0.5.

That is, in the case of using the above measurement method, the adhesive principal surface (X) in the present invention may be an area having a predetermined thickness. The predetermined thickness is a range from the position of 0.82 to 0.5 with respect to the atomic concentration (atm %) of carbon in the interior of a resin layer to a position below the detection limit. For example, the thickness may be about 5 nm. Specifically, the area of the adhesive principal surface (X) is an area located on a base material side as a part of the surface layer part of a resin layer. When the above-described measuring methods are used, the relation of the atomic concentration (atm %) of the various elements measured by XPS in any plane perpendicular to the thickness direction of a resin layer in this area may satisfy the above (2).

When a base material and a resin layer are firmly bonded to each other, a high-level technique is required to separate a resin layer from a base material with a resin layer while retaining an adhesive principal surface (X). In such cases, it is preferable to perform the XPS depth profile measurement from the side opposite to the adhesive principal surface (X) of a resin layer. In addition, whether or not a resin layer can be separated from a base material with a resin layer while retaining the adhesive principal surface (X) may be confirmed by, for example, performing XPS depth profile measurement using the surface of a resin layer side of a base material after the separation as a starting point. In addition, in this method, the result of XPS depth profile measurement using the adhesive principal surface (X) of a resin layer after the separation as a starting point and the result of XPS depth profile measurement using the surface of a resin layer side of a base material as a starting point may be combined to determine whether or not the adhesive principal surface (X) satisfies the requirement of (2) as an area having a predetermined thickness in the same manner as described above.

The interior N, the interior O, and the interior Si can be, for example, N concentration (atm %), O concentration (atm %), and Si concentration (atm %), respectively, or the average value, measured at least one point, preferably at least two points, for example, in the thickness direction from the point that the atomic composition measured sequentially from the adhesive principal surface (X) has not changed in the thickness direction, when the XPS depth profile measurement is performed from the adhesive principal surface (X).

For example, in the same manner as in the following method, every time the adhesive principal surface (X) is etched for 10 nm in the thickness direction, the atomic concentration (atm %) of N, O, and Si on the surface exposed by the etching is measured, and if the atomic composition is constant at a measurement point where the thickness (depth) from the adhesive principal surface (X) is 10 nm or more, it can be the average value of the measured values at six points where the thickness (depth) from the adhesive principal surface (X) is 10 nm to 60 nm. The thickness to be etched (etching thickness) may be appropriately adjusted, for example, within a range of 2 to 30 nm.

In addition, when the XPS depth profile measurement is performed from the opposite side of the adhesive principal surface (X) of a resin layer, a value or an average value of the N concentration (atm %), the O concentration (atm %), and Si concentration (atm %) measured at least one point, preferably at least two points, in the thickness direction between the first measurement point and the point at which the atomic composition sequentially measured starts to change in the thickness direction can be set as the interior N, the interior O, and the interior Si, respectively.

The principal surface N, the principal surface O and the principal surface Si and the interior N, the interior O and the interior Si are preferably average values obtained by measuring the atomic concentration of various elements in the surface part and the interior by the above-described method at least two positions randomly selected in the surface direction in the adhesive principal surface (X) of a resin layer.

Here, in the present invention, the interior N, the interior O, and the interior Si in a resin layer, which are measured by the above-described method, are actually atomic concentrations (atm %) measured for a part of the interior in one principal surface side. However, since the whole interior except the surface layer part of the resin layer is regarded as having the same composition, the above-described measuring method can be applied.

Hereinafter, an example of the specific conditions of the XPS depth profile measurement applicable to the composition analysis of the principal surface N, the principal surface O and the principal surface Si and the interior N, the interior O and the interior Si of a resin layer according to the present invention is shown. Specific examples of the XPS depth profile measurement performed under these conditions include FIG. 11A (Example 1) in Examples.

Analyzer: QUANTERA SXM manufactured by UL VAC-PHI, Inc.

X-ray source: monochromatized Al—Kα 15 kV 25 W

Sputter Ion: Ar (1 keV)

Depth profile: The depth profile in the depth direction is obtained by repeating the measurement at a predetermined thickness interval with $SiO_2$ conversion sputter thickness. This thickness interval is 10.8 nm (data for each 10.8 nm is obtained in the depth direction).

Determination: The background was determined by a Shirley method, and the obtained peak area was quantified using the relative sensitivity coefficient method. For the data-processing, MultiPak manufactured by UL VAC-PHI, Inc. is used Here, the requirement (2) in the adhesive principal surface (X) is composed of three requirements of (2-1) the principal surface O>the interior O, (2-2) the principal surface N>0, and (2-3) the principal surface Si/the interior Si≥5.

In the requirement (2-1), the principal surface O>the interior O. The relation between the principal surface O and the interior O is preferably such that the ratio of the principal surface O to the interior O represented by the principal surface O/the interior O is 2 or more. The principal surface O/the interior O is more preferably 7.5 or more. The upper limit of the principal surface O/the interior O is not particularly limited, but may be, for example, 100 or less. In the adhesive principal surface (X), the higher oxygen atomic concentration compared to the interior of a resin layer means that a chemical bond via oxygen is sufficiently present at the interface between a resin layer and a base material and thus a higher adhesiveness is obtained.

In the requirement (2-2), the principal surface N>0. In the adhesive principal surface (X), the nitrogen atom concentration exceeding 0 means that nitrogen atoms are present on the surface on the adhesive principal surface (X) side of a resin layer, and thus the adhesiveness is obtained. The nitrogen atoms are present as, for example, amino groups, preferably $—NH_2$ or $—NH_3^+$, which act as described above and are capable of trapping ink components such as water and acid, thereby enhancing adhesiveness and ink resistance.

In the requirement (2-3), the principal surface Si/the interior Si is 5 or more. The principal surface Si/the interior Si is preferably 6 or more, and more preferably 8 or more.

The upper limit of the principal surface Si/the interior Si is not particularly limited, and the interior Si may be infinite without being detected. In the adhesive principal surface (X), the fact that the silicon atomic concentration is more than 5 times higher than that of the interior of a resin layer means that a chemical bond via a siloxane bond is sufficiently present at the interface between a resin layer and a base material and thus a high adhesiveness is obtained.

The specific numerical value of the principal surface Si is, for example, preferably 1.0 to 10.0 atm %, more preferably 1.1 to 9.8 atm %, and still more preferably 1.3 to 9.5 atm %. When the principal surface Si is 1.0 atm % or more, the amount of the siloxane bond at the interface is sufficient, and thus a high adhesiveness is easily obtained. When the principal surface Si exceeds 10.0 atm %, the respective atomic concentrations of the adhesive principal surface (X) tend to be unbalanced, and the adhesiveness and the durability to the ink tend to be deteriorated.

In relation to the requirement (2-2), the principal surface N/the interior N is preferably 1.5 or more, that is, satisfies the requirement (3) in the present invention. The principal surface N/the interior N is more preferably 2 or more. The upper limit of the principal surface N/the interior N is not particularly limited, but may be, for example, 100 or less. In the adhesive principal surface (X), the fact that the nitrogen atom concentration is more than two times higher than that of the interior of a resin layer means that sufficient amounts of nitrogen atoms are present on the surface on the adhesive principal surface (X) side of a resin layer and thus a high adhesiveness is obtained.

In relation to the requirement (2-2), a spectrum obtained by analyzing the binding state of nitrogen atoms by XPS on the adhesive principal surface (X) has a peak of $—NH_2$ or $—NH_3^+$. Analysis of the binding state by XPS can be performed, for example, by the following method.

In XPS, it is possible to analyze the binding states of the elements. In the present invention, the binding state of the nitrogen atoms on the adhesive principal surface (X) is measured by analyzing the binding state by XPS, and the amount of $—NH_2$ and $—NH_3^+$ to be present is confirmed. In the following, an example of the specific conditions for analyzing the binding state by XPS applicable to the present invention is shown. Specific examples of the spectrum obtained by measuring the binding state of nitrogen atoms under the condition include FIG. 12A (Example 2) in Examples.

Analyzer: QUANTERA SXM manufactured by UL VAC-PHI, Inc.

X-ray source: monochromatized Al—Kα 15 kV 25 W

Pass energy: 55 eV

Data-processing: MultiPak manufactured by UL VAC-PHI, Inc. was used.

Elemental composition analysis: The background processing was performed using a Shirley method, and the elemental composition is quantified using the relative sensitivity coefficient from the obtained peak area.

Figure 12A:
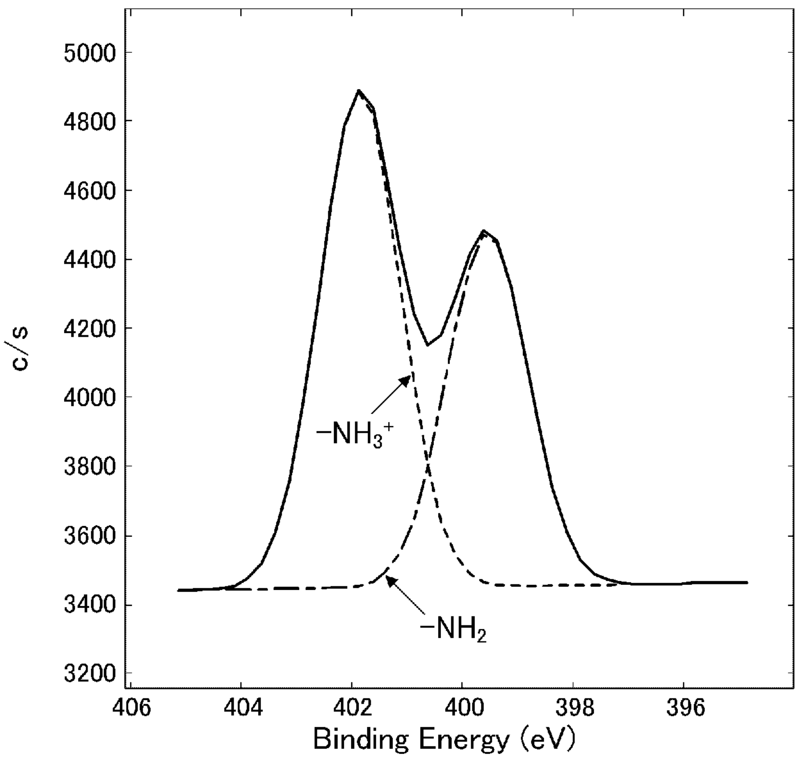
FIG. 12A This is a diagram showing a spectrum obtained by analyzing the binding state of nitrogen atoms by XPS according to Example 1.

Peaks and peak areas of $—NH_2$ and $—NH_3^+$ can be determined by the following method. First, the peak shift due to the charge is corrected from the bonding energy (binding energy) of the carbon 1 s peak, and then a peak related to nitrogen atoms (indicated by a solid line in the drawing) is separated for each peak of the respective states. In FIG. 12A, a peak related to nitrogen atoms can be separated into two peaks (a peak showing a maximum value in 399.5 eV and a peak showing a maximum value in 401.8 eV). The determination of the state of the nitrogen atom in each peak is based on the binding energy. In FIG. 12A, the peak showing the maximum value in 399.5 eV is the peak of $—NH_2$, and the peak showing the maximum value in 401.8 eV is the peak of $—NH_3^+$.

The binding energies of $—NH_2$ and $—NH_3^+$ were confirmed based on values shown in the literature "Completely revised edition: Effects and Usage of Silane Coupling Agents (1st Edition, Nov. 15, 2012)" ($—NH_2$; 399.0 eV, $—NH_3^+$; 400.6 eV). Using this value as a peak, fitting is performed under the condition that FWHM (full width at half maximum) of the peak falls within the range of 1.0 to 2.5 and under the condition that FWHM (full width at half maximum) of the peak of $—NH_2$ and the peak of $—NH_3^+$ are equal, and the area of each peak is calculated. From the peak areas of $—NH_2$ and $—NH_3^+$, the ratio of nitrogen atoms derived from $—NH_2$ and nitrogen atoms derived from $—NH_3^+$ to the total amount of nitrogen atoms is determined.

Hereinafter, preferred embodiments of the present invention will be described referring to the drawings. However, the scope of the present invention is not limited to the illustrated examples. The members shown in these drawings can be appropriately modified without departing from the spirit of the present invention. In the present specification, for convenience of explanation, the direction in which the ink is ejected from an ink ejection device is defined as a lower direction, and the direction opposite to the lower direction is defined as an upper direction. The arrow in an ink flow path in the drawing indicates the flow direction of the ink.

Figure 3:
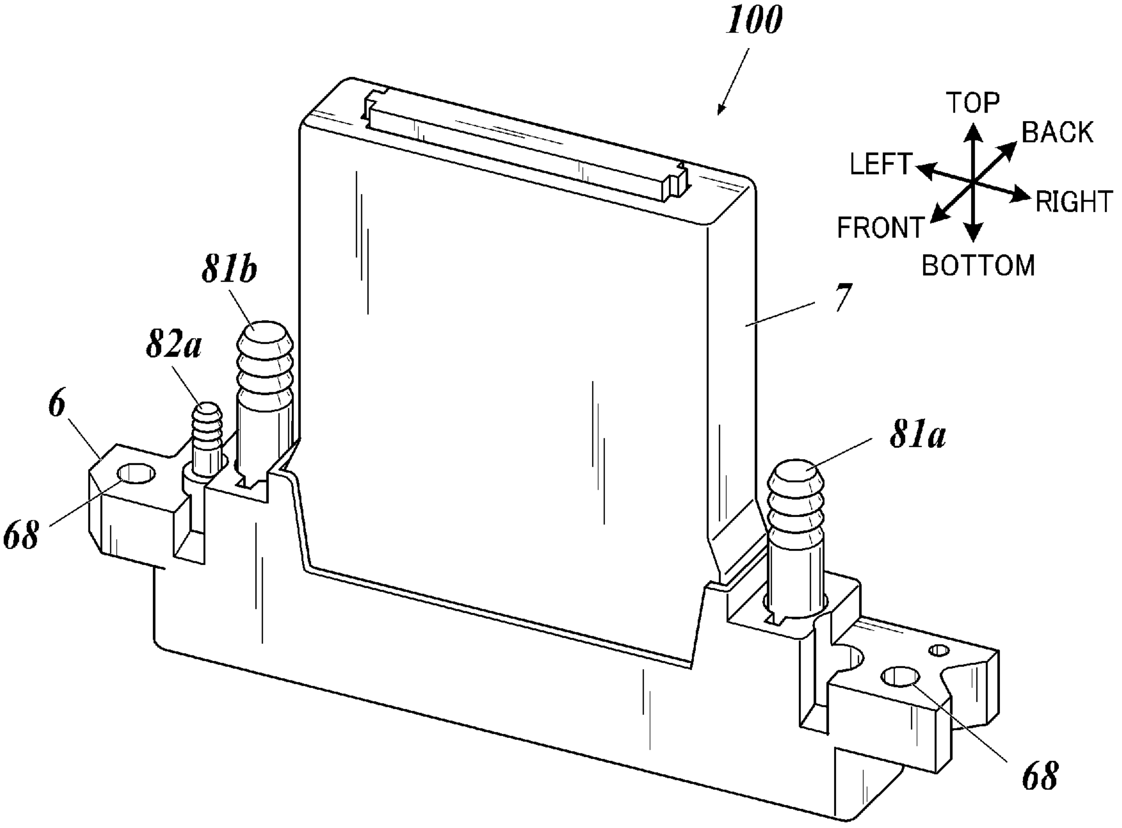
FIG. 3 This is a perspective view showing an exemplary embodiment of an ink ejection device of the present invention.
Figure 4:
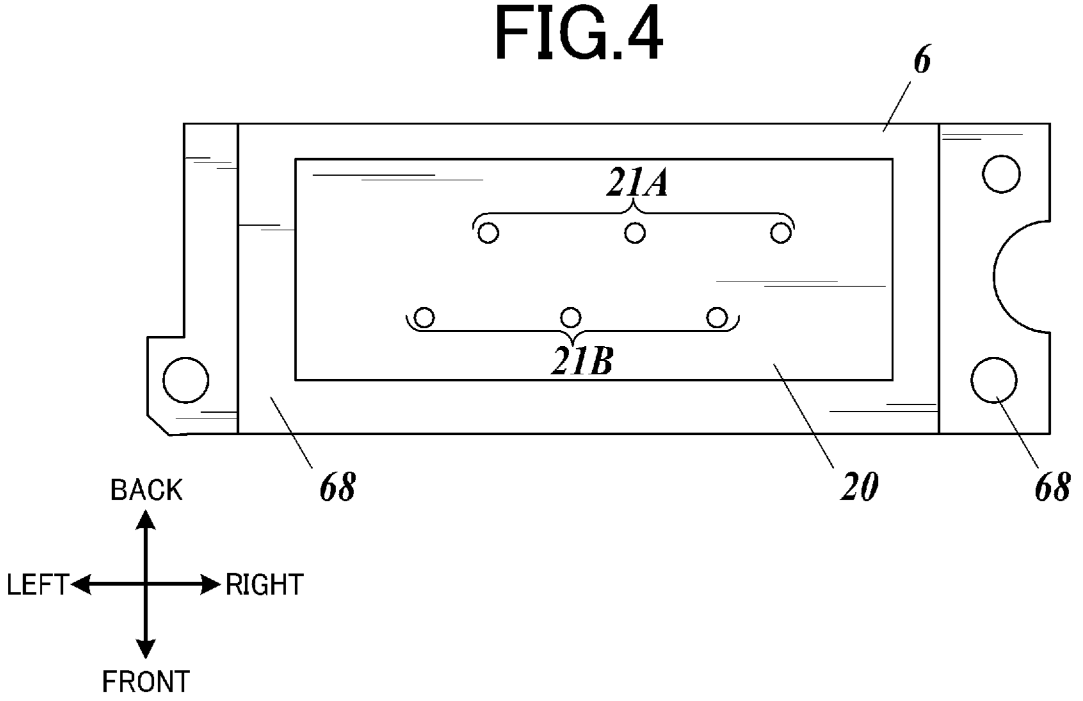
FIG. 4 This is a bottom view of an ink ejection device shown in FIG. 3.

FIG. 3 is a perspective view showing an exemplary embodiment of an ink ejection device of the present invention, and FIG. 4 is a bottom view of an ink ejection device shown in FIG. 3. When recording on a recording medium, the bottom surface of an ink ejection device and the recording surface of the recording medium face each other. Specifically, the recording medium is arranged such that the recording surface is positioned on the lower side of the ink ejection device and in a direction perpendicular to the direction in which the ink is ejected, and ink jet recording is performed while the recording medium is conveyed. In the following explanation, for convenience of explanation, a direction in which a recording medium is conveyed is defined as the longitudial direction, and a direction perpendicular to the direction in which a recording medium is conveyed on the recording surface is defined as the crosswise direction.

Figure 5:
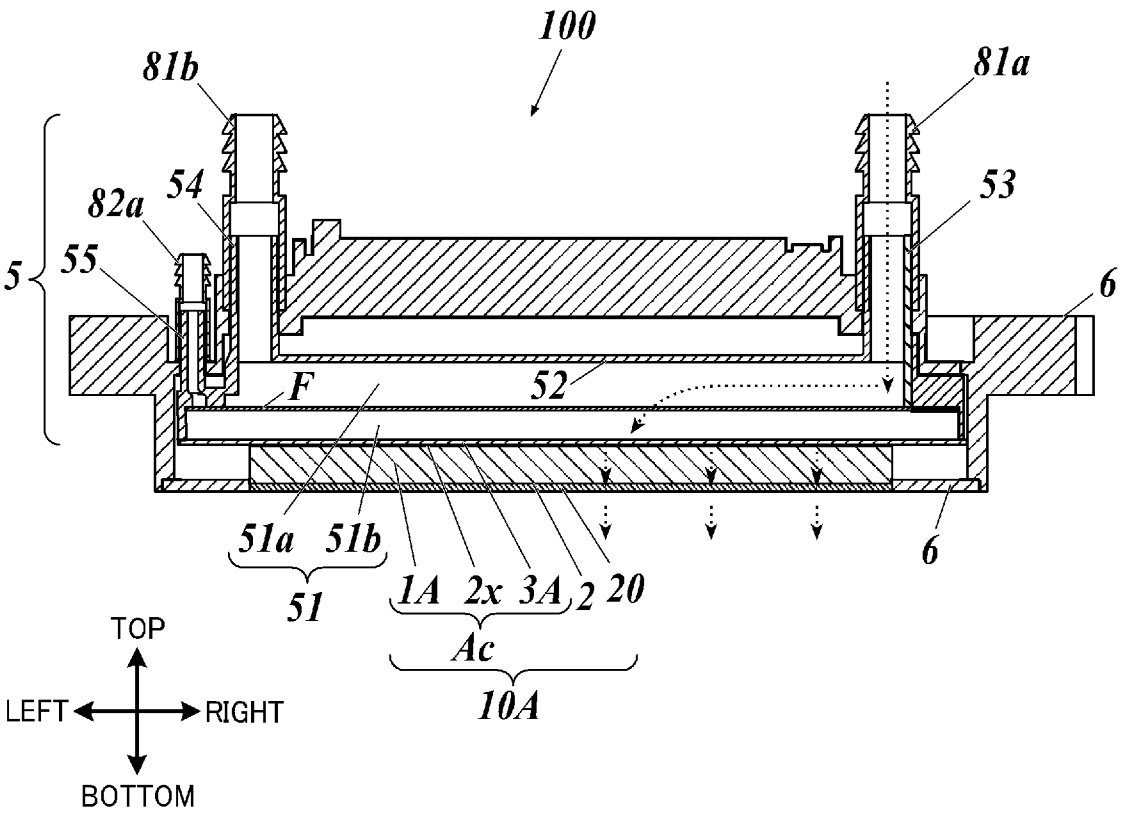
FIG. 5 This is a cross-sectional view of the lower part of an ink ejection device shown in FIG. 3 cut in the crosswise direction.
Figure 6:
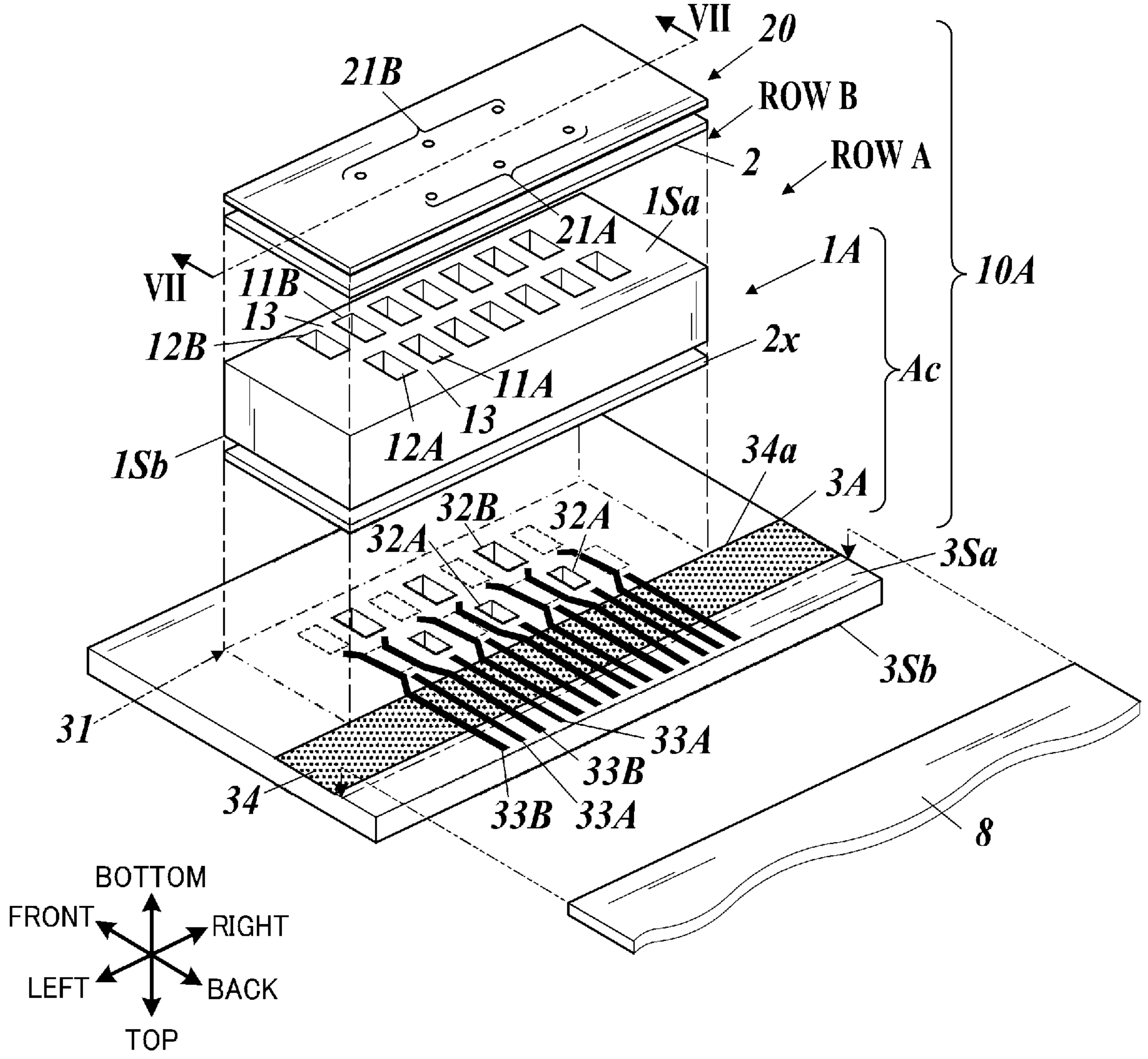
FIG. 6 This is an exploded perspective view of a head chip included in an ink ejection device shown in FIG. 3.

FIG. 5 is a cross-sectional view of the lower part of an ink ejection device shown in FIG. 3 cut in the crosswise direction. FIG. 6 is an exploded perspective view of a head chip included in an ink ejection device shown in FIG. 3. FIG. 7 is a cross-sectional view taken along the line VII-VII in FIG. 6, and FIG. 8 is an enlarged view of a part enclosed by a dashed line in FIG. 7.

As shown in FIG. 3, FIG. 4 and FIG. 5, and the like, an ink ejection device 100 of the present embodiment comprises a head chip 10A and a manifold 5 for storing ink to be supplied to the head chip 10A. The head chip 10A comprises a nozzle plate 20 having an actuator Ac of the shear-mode type and a nozzle 21 for ejecting ink from the actuator Ac to the outside of the ink ejection device 100. The actuator Ac comprises a laminated substrate in which a flow path substrate 3A, an adhesive layer 2X and a pressure chamber substrate 1A are sequentially laminated from the manifold 5 side, and the pressure chamber substrate 1A of the actuator Ac is adhered to the nozzle plate 20 via the adhesive layer 5.

Both an adhesive layer 2X and an adhesive layer 2 are a resin layer whose principal surfaces are in contact with the surface of a base material. As will be described later, since the side surface of an adhesive layer 2X is covered with a protective film 4 (see FIG. 7), it is not in contact with an ink flow path. On the other hand, the side surface of an adhesive layer 2 is in contact with an ink flow path. The adhesive layer 2 is an adhesive layer that satisfies the requirements of the present invention, for example, at least one principal surface satisfies the requirement (2). A protective film 4 covering the side surface of the adhesive layer 2X is typically a resin layer. Hereinafter, in the present specification, unless otherwise specified, an "adhesive layer" and a "protective film" are both composed of a resin layer.

As will be described later, it is preferable that a pressure chamber substrate 1A is made of a piezoelectric body including, for example, PZT, and that a nozzle plate 20 is made of a metal. Considering the components of the pressure chamber substrate 1A and the nozzle plate 20, it is preferable that at least a principal surface of an adhesive layer 2 in contact with the nozzle plate 20 is an adhesive principal surface (X), and it is more preferable that both principal surfaces are adhesive principal surfaces (X).

As described above, an adhesive layer 2 is a resin layer. In the present specification, a "resin layer" is a layer composed mainly of resin. The resin contained in the resin layer may be a thermoplastic resin or a cured resin. The cured resin refers to a resin obtained by curing a curable compound by reacting with light or heat to form a polymer. The resin layer may contain inorganic or organic components other than resin. Examples of the components other than resin include additives and fillers added to the resin layer for various purposes. The content of the resin contained in the resin layer may be, for example, approximately 50% by mass or more relative to the total amount of the resin layer. In the present specification, components related to the polymerization (curing) of a curable compound such as a plasticizer or the like in a thermoplastic resin, and a curing agent, a polymerization initiator, a catalyst, a chain transfer inhibitor, and a polymerization inhibitor in a cured resin, are included in the scope of the resin.

A resin layer according to the present invention contains carbon, oxygen, nitrogen and silicon. These elements may be contained in any of the resin and the components other than the resin contained in a resin layer. The resin layer according to the present invention typically contains hydrogen.

Specific examples of the thermoplastic resin that can be used as a resin contained in the resin layer include polyolefin resin, polystyrene resin, polyamide resin, polyimide resin, polyester resin, acrylic resin, polyurethane resin, polyvinylchloride resin, polyvinyl acetate resin, ethylene vinyl acetate resin, epoxy resin, phenol resin, melamine resin, polycarbonate resin, polyacetal resin, polyphenylene ether resin, polyphenylene sulfide resin, polysulfone resin, styrene-acrylonitrile copolymer (AS resin), styrene-(meth)acrylic acid copolymer, styrene-methacrylic acid methyl copolymer, acrylonitrile-butadiene-styrene copolymer (ABS resin), methacrylic acid methyl-butadiene-styrene copolymer (MBS resin), and the like.

Specific examples of the cured resin that can be used as a resin contained in the resin layer include phenol resin, epoxy resin, acrylic resin, urethane resin, melamine resin, alkyd resin, unsaturated polyester resin, urea resin, polyparaxylylene resin, and the like.

All of these resins contain carbon and hydrogen and, depending on the type, further contain oxygen or nitrogen. Further, even if the resin has a typical structure that does not contain oxygen, nitrogen, or silicon, the resin may contain oxygen, nitrogen, or silicon by introducing a substituent, modification, or the like.

When a resin layer containing a thermoplastic resin as a resin is formed on a base material or between base materials, typically, the thermoplastic resin itself is coated on a base material as a liquid composition dissolved in, for example, a solvent, and dried to obtain a resin layer. When a resin layer is formed between base materials, a liquid composition is applied on one base material, the other base material is laminated on the coating film of the applied liquid composition, and the coating film is dried to obtain a resin layer. When a resin layer contains a component other than the resin, the component other than the resin is blended into the liquid composition.

In addition, when a resin layer containing a cured resin as a resin is formed on a base material or between base materials, typically, a liquid composition containing a curable compound and a component related to polymerization (curing) of a curable compound selected as necessary from a curing agent, a polymerization initiator, a catalyst, a chain transfer inhibitor, a polymerization inhibitor, and the like, and further being added a solvent or the like as necessary is coated on a base material and cured by heat or light to obtain a resin layer. When a resin layer is formed between base materials, a liquid composition is applied on one base material, the other base material is laminated on the coating film of the applied liquid composition, and the coating film is cured by heat or light to obtain a resin layer. When a resin layer contains a component other than the resin, the component other than the resin is blended into the liquid composition. Hereinafter, a curable compound and a component related to the polymerization (curing) of the curable compound are also referred to as a "resin component".

In the above, conditions such as a solvent, an applying method of the liquid composition, and a drying/curing of the coating film in the preparation of the liquid composition used for forming a resin layer are appropriately selected depending on the type of the resin. The thickness of a resin layer is appropriately selected in accordance with the type, application, location, and the like of the resin.

When a resin layer is formed on a base material or between base materials by using a thermoplastic resin or a cured resin in this manner, in order for a resin layer to have a principal surface satisfying (1) and (2), it is preferable to contain a component having at least nitrogen and silicon, which is unevenly distributed in the vicinity of the interface between a resin layer and a base material when the resin layer is formed, as a component other than the resin to be blended in the liquid composition. Examples of the component unevenly distributed in the vicinity of the interface between a resin layer and a base material when the resin layer is formed include a coupling agent, and examples of the coupling agent having nitrogen and silicon include an amino-based silane coupling agent.

Amino-Based Silane Coupling Agent

As the amino-based silane coupling agent, for example, a compound having a structure represented by the following formula (I) is preferable.

$$R^1_{4-n}SiX_n \qquad \text{Formula (I)}$$

$R^1$ represents a monovalent organic group, and at least one of which is a monovalent organic group including at least one of a primary amine group, a secondary amino group, a tertiary amino group, an acid-neutralizing group of an amino group, and a quaternary ammonium base. X represents a monovalent hydrolyzable group. n represents an integer of 1 to 3. When two or more $R^1$ are present, the two or more $R^1$ may be the same or different.

Examples of the monovalent hydrolyzable group as X include alkoxy groups, acyloxy groups, ketoxime groups, alkenyloxy groups, amino groups, amino oxy groups, amide groups, isocyanato groups, and halogen atoms. When n is 2 or more, a plurality of X may be the same or different.

Preferred hydrolyzable groups include alkoxy groups and halogen atoms, and particularly preferred are alkoxy groups having 1 to 4 carbon atoms. As the amino-based silane coupling agent represented by the formula (I), an amino-based silane coupling agent having a structure represented by the following formula (II) is more preferable. The amino-based silane coupling agent represented by the formula (II) is a compound in which the hydrolyzable group X in the formula (I) is an alkoxy group (having 1 to 4 carbon atoms).

[Chemical formula 1]

FORMULA(II)

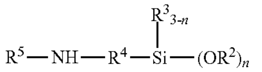

In the formula (II), $R^2$ and $R^3$ represent alkyl groups having 1 to 4 carbon atoms. Examples of the alkyl group having 1 to 4 carbon atoms include a methyl group, an ethyl group, a propyl group, an isopropyl group, and a butyl group. n represents an integer of 1 to 3, preferably 2 or 3.

In the formula (II), $R^4$ represents any of an alkylene group having 1 to 20 carbon atoms and an arylene group. Examples of the alkylene group having 1 to 20 carbon atoms include a methylene group, an ethylene group, a propane-1,2-diyl group, a propane-1,3-diyl group, a butane-1,4-diyl group, a pentane-1,5-diyl group, a hexane-1,6-diyl group, an octane-1,8-diyl group, a 2-methyl-hexane-1,6-diyl group, and a decane-1,10-diyl group. Examples of the arylene group include a phenylene group and a naphthylene group. These groups may be substituted with halogen, hydroxy groups, and the like.

In the formula (II), $R^5$ represents any of a hydrogen atom, an alkyl group having 1 to 20 carbon atoms, and an aryl group. Examples of the alkyl group having 1 to 20 carbon atoms include a methyl group, an ethyl group, a propyl group, an isopropyl group, a butyl group, an isobutyl group, a tert-butyl group, a pentyl group, an isopentyl group, a tert-pentyl group, a hexyl group, an isohexyl group, an octyl group, a 2-ethylhexyl group, a tert-octyl group, a nonyl group, a decyl group, an undecyl group, a dodecyl group, a tridecyl group, a tetradecyl group, a pentadecyl group, a hexadecyl group, a heptadecyl group, and an octadecyl group. Examples of the aryl group include a phenyl group and a naphthyl group. These groups may be further substituted with an aryl group, a heterocycle, an amino group, an amide group, an imino group, a halogen atom, a hydroxy group, or the like.

Specific examples of the amino-based silane coupling agent include 3-aminopropyltrimethoxy silane, 3-aminopropyltriethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-triethoxysilyl-N-(1,3-dimethylbutylidene)propylamine, N-phenyl-3-aminopropyltrimethoxysilane, N-methyl-3-aminopropyltrimethoxysilane, N-ethyl-3-aminopropyltrimethoxysilane, N-butyl-3-aminopropyltrimethoxysilane, N,N-dimethyl-3-aminopropyltrimethoxysilane, N,N-diethyl-3-aminopropyltrimethoxysilane, N,N-dibutyl-3-aminopropyltrimethoxysilane, N-(vinylbenzyl)-3-aminopropyltrimethoxysilane hydrochloride, octadecyldimethyl(3-trimethoxysilylpropyl)ammonium chloride, tetradecyldimethyl(3-trimethoxysilylpropyl)ammonium chloride, N-trimethoxysilylpropyl-N,N,N-tri-n-butylammonium bromide, N-trimethoxysilylpropyl-N,N,N-tri-n-butylammonium chloride, and N-trimethoxysilylpropyl-N,N,N-trimethylammonium chloride.

Among these, the amino-based silane coupling agent preferably has a molecular weight of 250 or less per a nitrogen atom. Further, an amino-based silane coupling agent having two or more alkoxy groups bonded to silicon atoms, for example, a compound having n of 2 or more among the compounds represented by the above formula (II) is preferable.

Examples of the amino-based silane coupling agent satisfying such conditions include 3-aminopropyltrimethoxysilane, 3-aminopropyltriethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, N-methyl-3-aminopropyltrimethoxysilane, N-ethyl-3-aminopropyltrimethoxysilane, N-butyl-3-aminopropyltrimethoxysilane, N,N-dimethyl-3-aminopropyltrimethoxysilane, and N,N-diethyl-3-aminopropyltrimethoxysilane.

Furthermore, among these, an amino-based silane coupling agent having $-NH_2$ group at the terminal is preferable, and 3-aminopropyltrimethoxysilane, 3-aminopropyltriethoxysilane, N-(2-aminoethyl)-3-aminopropylmethyldimethoxysilane, N-(2-aminoethyl)-3-aminopropyltrimethoxysilane, and N-(2-aminoethyl)-3-aminopropyltriethoxysilane are particularly preferable.

When an amino-based silane coupling agent is contained in the resin composition to be described below, the hydrolyzable group of the amino-based silane coupling agent is hydrolyzed during a resin layer forming process to form a silanol group, and for example, a "base material-O—Si" bond is formed by dehydration co-condensation with OH group on a base material. On the other hand, the terminal amino group in the preferred embodiment is considered to be present near the interface in the state of $-NH_2$ or $-NH_3^+$ to perform the above-described function.

In forming a resin layer having a principal surface satisfying the above requirements (1) and (2), the content of the amino-based silane coupling agent relative to the total amount of the resin composition is preferably in the range of 0.01 to 10% by mass, and more preferably in the range of 0.1 to 5% by mass. When the content of the amino-based silane-coupling agent is within the above range, it is easy to satisfy the requirement (2), preferably the requirement (3), in a resin layer where the principal surface is in contact with a base material, without affecting the film formability, the cross-linking structure, and the like of the resin layer.

When a resin layer is an adhesive layer, the resin contained in a resin layer is preferably an epoxy resin. When a resin layer is a protective layer, examples thereof include a polyimide resin and a polyparaxylylene resin. Hereinafter, an embodiment in which a resin layer contains an epoxy resin will be described below.

When a resin layer according to the present invention contains an epoxy resin, the resin layer is formed using, for example, a resin component containing an epoxy compound which is a raw material component of the epoxy resin and a curing agent, and a resin composition containing the amino-based silane coupling agent as a component other than the resin component. In the present invention, the "resin composition" is a composition composed of raw material having a solid content constituting a resin layer, and does not include a solvent. When the resin composition is a liquid composition having a viscosity enough to form a coating film on a base material, in particular, a solvent may not be added. When the resin composition is solid or has a high viscosity that makes it difficult to form a coating film on a base material, a solvent is added to form a resin layer as a liquid composition having an appropriate viscosity.

The epoxy resin is a resin obtained by using an epoxy compound having a plurality of epoxy groups as a curable compound and curing the epoxy compound by the action of a curing agent. When a resin layer is formed using an epoxy resin, a resin composition containing a resin component for forming an epoxy resin and a component other than the resin component, for example, an amino-based silane coupling agent or the like is used. Hereinafter, components contained in a resin composition (hereinafter, also simply referred to as a "resin composition" or an "epoxy resin composition") when a resin layer is formed using an epoxy resin will be described.

(Epoxy Compound)

The epoxy compound is not particularly limited as long as it has at least two epoxy groups in the molecule, and can be appropriately selected according to the purpose. For example, in order to obtain an epoxy resin having a cross-linked structure, the number of epoxy groups included in the epoxy compound is preferably 3 or more, and more preferably 4 or more. Further, by using an epoxy compound having an epoxy equivalent weight of preferably 300 or less, more preferably 220 or less, it is easy to obtain an epoxy resin having a dense structure with a short cross-linking point distance.

Examples of the epoxy compound include a polyglycidyl ether compound of a mononuclear polyhydric phenol compound, a polyglycidyl ether compound of a polynuclear polyhydric phenol compound, a polyglycidyl ether of a polyhydric alcohol; polyglycidyl ether compound of polyols in which polyalkylene oxide is added to a mononuclear polyhydric phenol compound, a polynuclear polyhydric phenol compound, and a polyhydric alcohol; homopolymers or copolymers of glycidyl esters and glycidyl methacrylates of aliphatic, aromatic or alicyclic polybasic acids; epoxy compounds having glycidyl amino groups, epoxy compounds of cyclic olefin compounds, heterocyclic compounds, or compounds which are internally crosslinked by a prepolymer of a terminal isocyanate of these epoxy resins, or compounds which are polymerized with a polyvalent active hydrogen compound (for example, a polyhydric phenol, a polyamine, a carbonyl group-containing compound, a polyphosphate ester, and the like). These may be used in one type alone, or it may be used in combination with two or more types.

Examples of the mononuclear polyhydric phenol compound include hydroquinone, resorcin, pyrocatechol, and phloroglucinol.

Examples of the polynuclear poly hydric phenol compound include dihydroxynaphthalene, biphenol, methylenebisphenol(bisphenol F), methylenebis(orthocresol), ethylidenebisphenol, isopropylidenebisphenol(bisphenol A), isopropylidenebis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxy bisphenol, phenol novolac, orthocresol novolac, ethylphenol novolac, butylphenol novolac, octylphenol novolac, resorcin novolac, and terpene phenol.

Examples of the polyhydric alcohols include ethylene glycol, propylene glycol, butylene glycol, hexanediol, polyglycol, thiodiglycol, dicyclopentadiene dimethanol, glycerin, trimethylolpropane, pentaerythritol, sorbitol, and bisphenol A-ethylene oxide adducts.

Examples of the homopolymer or copolymer of the glycidyl ester and the glycidyl (meth)acrylate of the aliphatic, aromatic or alicyclic polybasic acid include homopolymers or copolymers of the glycidyl ester and the glycidyl (meth) acrylate of the aliphatic, aromatic or alicyclic polybasic acid, such as maleic acid, fumaric acid, itaconic acid, succinic acid, glutaric acid, suberic acid, adipic acid, azelaic acid, sebacic acid, dimer acid, trimeric acid, phthalic acid, isophthalic acid, terephthalic acid, trimellitic acid, trimesic acid, pyromellitic acid, tetrahydrophthalic acid, hexahydrophthalic acid, and endomethylenetetrahydrophthalic acid.

Examples of the epoxy compound having the glycidylamino group include N,N-diglycidylaniline, bis(4-(N-methyl-N-glycidylamino)phenyl)methane, diglycidyl orthotoluidine, N,N-bis(2,3-epoxypropyl)-4-(2,3-epoxypropoxy)-2-methylaniline, N,N-bis(2,3-epoxypropyl)-4-(2,3-epoxypropoxy)aniline, and N,N,N',N'-tetra(2,3-epoxypropyl)-4,4'-diaminodiphenylmethane.

Examples of the epoxy compound of the cyclic olefin compound include vinylcyclohexene diepoxide, dicyclopentane diene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl) adipate. Examples of the epoxidized conjugated diene polymer include epoxidized poly butadiene and epoxidized styrene-butadiene copolymers.

Examples of the heterocyclic compound include triglycidyl isocyanurate.

Among them, from the viewpoint of performance of a cured product such as workability, adhesiveness, and solvent resistance at the time of forming a resin layer, polyglycidyl ether of a polynuclear polyhydric phenol compound, polyglycidyl ether of a polyhydric alcohol, an alkylene oxide-modified epoxy resin of a polynuclear poly hydric phenol compound, and an epoxy compound having a glycidyl amino group are preferable.

As the epoxy compound, a commercially available product may be used. Specific examples of the commercially available product include jER (registered trademark) series (manufactured by Mitsubishi Chemical Corporation), EPPN series, and EOCN series (manufactured by Nippon Kayaku Co., Ltd.).

The content of the epoxy compound relative to the total amount of the epoxy resin composition may be, for example, in the range of 25 to 99% by mass, and more preferably in the range of 40 to 95% by mass. When the content of the epoxy compound is within the above range, the crosslinked structure can be constructed in the resin composition and the resistance to ink penetration can be improved.

(Curing Agent)

The curing agent is classified into a polyaddition type curing agent and a catalytic type curing agent. The polyaddition type curing agent is a compound having a plurality of groups having reactivity with an epoxy group, and examples of the reactive group include a carboxy group, a hydroxyl group, an amino group having an active hydrogen, a sulfhydryl group (—SH), and an acid anhydride group. The catalytic curing agent is a compound that accelerates the reaction between epoxy compounds, and examples thereof include tertiary amines, imidazole compounds, and phosphorus compounds.

In the present invention, the curing agent is preferably a curing agent having a pKa of $H^+$ adduct at 25° C. is 3 or more. In the present specification, unless otherwise specified, a "pKa" is a pKa at 25° C. in water. In addition, a pKa at 25° C. in water can be measured from electric conductivity or the like.

Here, it is preferable to use a curing agent having a pKa of $H^+$ adduct of 3 or more, because it is possible to accelerate the reaction of the epoxy compound or the amino-based silane coupling agent. The upper limit of the pKa of $H^+$ adduct in the curing agent is not particularly limited, but may be approximately 50. As the curing agent having a pKa of $H^+$ adduct of 3 or more, a nitrogen-containing compound is preferable.

Specific examples of the curing agent having a pKa of $H^+$ adduct of 3 or more include a polyamine compound having a plurality of amino groups having active hydrogens for the polyaddition type curing agent, and a tertiary amines and imidazole compounds for the catalytic curing agent. As the curing agent having a pKa of $H^+$ adduct of 3 or more, a nitrogen-containing catalytic curing agent is preferable, and an imidazole compound is particularly preferable.

The imidazole compound is a generic term for a group of compounds including imidazole and derivatives thereof. Preferred imidazole compounds are those in which at least one of the 1-, 2- and 4-positions of the imidazole is substituted with a substituent. Examples of the substituent include an alkyl group, an aryl group and an aralkyl group.

Alkyl groups include branched or straight-chain alkyl groups such as methyl groups, ethyl groups, isopropyl groups, t-butyl groups, hexyl groups, dodecyl groups, undecyl groups, pentadesyl groups, heptadesyl groups, and cyclic alkyl groups such as cyclopentyl groups, cyclohexyl groups, which may have substituents.

The substituents include alkyl groups, alkenyl groups, aryl groups, heterocyclic groups, halogen atoms, alkoxy groups, aryloxy groups, alkoxycarbonyl groups, aryloxycarbonyl groups, sulfonamide groups, sulfamoyl groups, ureide groups, acyl groups, acyloxy groups, carbamoyl groups, alkylsulfonyl groups, arylsulfonyl groups, cyano groups, nitro groups, sulfo groups, hydroxy groups, and the like.

Examples of the aryl group include a phenyl group and a naphthyl group, which may be substituted with the substituents described in the alkyl group.

The aralkyl group is an alkyl group substituted with an aryl group, and examples thereof include a benzyl group, a phenethyl group, and a naphthylmethyl group, and these may be substituted with the substituents described in the alkyl group.

Specific examples of the imidazole compound include, but are not limited to, imidazole, 2-methylimidazole, 4-methylimidazole, 2-heptadecylimidazole, 4-heptadecylimidazole, 1,2-dimethylimidazole, 2-ethyl-4-methylimidazole, 2-phenylimidazole, 4-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adducts, 2,4-diamino-6-[2'-methylimidazolyl-(1')]-ethyl-s-triazine isocyanuric acid adducts, 2-phenylimidazole isocyanuric acid adducts, 2-phenyl-4,5-dihydroxymethylimidazole, and 2-phenyl-4-methyl-5-hydroxymethylimidazole.

Among these, imidazole compounds having an alkyl group or an aryl group at the 4-position such as 2-ethyl-4-methylimidazole, 4-methylimidazole, 4-heptadecylimidazole, 4-phenylimidazole, and 2-phenyl-4-methylimidazole are preferable. One of these imidazole compounds may be used alone, or two or more of them may be used in combination.

As the imidazole compound, a commercially available product may be used. Specific examples of the commercially available product include, but are not limited to, SIZ, 2MZ-H, C11Z, C17Z, 1.2DMZ, 2E4MZ, 2PZ, 2PZ-PW, 2P4MZ, 1B2MZ, 1B2PZ, 2MZ-CN, C11Z-CN, 2E4MZ-CN, 2PZ-CN, C11Z-CNS, 2PZCNS-PW, 2MZ-A, 2MZA-PW, C11Z-A, 2E4MZ-A, 2MA-OK, 2MAOK-PW, 2PZ-OK, 2PHZ-PW, 2P4MHZ-PW of CUREZOL series manufactured by Shikoku Kasei Holdings Corporation.

The content of the curing agent relative to the total amount of the epoxy resin composition is preferably in the range of 3 to 15% by mass, and more preferably in the range of 5 to 11% by mass. When the content of the curing agent is within the above range, it is preferable to improve the ink resistance without inhibiting the crosslinking structure construction while promoting the crosslinking reaction of the resin.

As described above, in the epoxy resin composition, it is preferable to use a curing agent having a pKa of $H^+$ adduct of 3 or more is preferably used as the curing agent. If a curing agent having a pKa of $H^+$ adduct of 3 or more is used, a curing agent having a pKa of $H^+$ adduct of less than 3 may be further used as needed. However, all of the curing agents contained in the epoxy resin composition are preferably curing agents having a pKa of $H^+$ adduct of 3 or more. In other words, the epoxy resin composition preferably contains a curing agent having a pKa of $H^+$ adduct of 3 or more within a range of 3 to 15% by mass.

As described above, as the curing agent having a pKa of $H^+$ adduct of 3 or more, a nitrogen-containing catalytic curing agent, particularly, an imidazole compound, is preferable. When a nitrogen-containing catalytic curing agent, for example, an imidazole compound, is used as the curing agent having a pKa of $H^+$ adduct of 3 or more in the epoxy resin composition, a polyaddition type curing agent having a pKa of $H^+$ adduct of 3 or more, for example, a polyamine compound, may be used in addition to the nitrogen-containing catalytic curing agent.

(Other Resin Components)

In addition to the epoxy compound and the curing agent, the epoxy resin composition may contain a polymerization inhibitor, a chain transfer inhibitor, or the like as a resin component as long as the effect of the present invention is not impaired.

(Amino Silane Coupling Agent)

The epoxy resin composition used for forming a resin layer containing the epoxy resin preferably contains the amino-based silane coupling agent described above. As a result, the obtained resin layer can satisfy the above (2) in any of the principal surfaces in contact with a base material.

(Other Components)

The epoxy resin composition may further contain other solid components such as various additives or fillers as long as the effect of the present invention is not impaired. Examples of the additive include surfactant, a UV absorber, an antioxidant, a rheology control agent, an antistatic agent, and a photopolymerization initiator. Examples of the filler include carbonates such as calcium carbonate and magnesium carbonate: sulfates such as barium sulfate and magnesium sulfate: silicates such as aluminum silicate and zirconium silicate; oxides such as silicon oxide, iron oxide, titanium oxide, aluminum oxide, and zinc oxide: kaolin, talc, asbestos powder, quartz powder, mica, and glass fibers. If necessary, conductive particles may be used as the filler.

The above-described other solid components sometimes contain oxygen atoms, silicon atoms, and nitrogen atoms, but the other solid components are typically dispersed uniformly throughout a resin layer in a small amount. In such a case, the requirement (2) may be satisfied, for example, as a result of combining the amino-based silane coupling agent and other solid components.

A forming method of a resin layer containing an epoxy resin using the above epoxy resin composition is not particularly limited. When the epoxy resin composition is a liquid composition, it is coated as it is, or when the epoxy resin composition is not a liquid, it is coated on a base material as a liquid composition by using a solvent, to form a coating film, and if required, another base material is laminated on the coating film and cured using heat or light. The conditions for curing by heat or light are appropriately adjusted according to the type of the epoxy compound and the curing agent used.

Although the epoxy resin composition has been described above, in the resin composition containing other resins other than the epoxy resin, a resin layer according to the present invention can be formed by, for example, blending into a resin composition so that an adhesive principal surface (X) can be obtained in a resin layer in which an amino-based silane coupling agent or the like can be obtained, and usually operating in the same manner as forming a resin layer using the resin on a base material or between base materials.

In an ink ejection device 100, an actuator Ac has a laminated substrate including one flow path substrate 3A and one pressure chamber substrate 1A, which are bonded by an adhesive layer 2X. The configuration of an actuator Ac is not limited thereto, and may include a plurality of flow path substrates and a plurality of pressure chamber substrates, and may further include a substrate other than the flow path substrate and the pressure chamber substrate.

When an adhesive layer provided for bonding substrates has a part in contact with the ink flowing through an ink flow path, the adhesive layer preferably satisfies the requirements of the present invention, but does not necessarily have to be satisfied. That is, in an ink ejection device of the present invention, any resin layer may satisfy the requirements of the present invention, and if an adhesive layer 2 is a resin layer satisfying the requirements of the present invention, the other resin layer having a part in contact with the ink need not necessarily satisfy the requirements of the present invention. However, it is preferable that all of the resin layers having a principal surface in contact with a base material and having a part in contact with the ink satisfy the requirements of the present invention.

Although it depends on the type of a resin layer, it is preferable that the principal surface of a resin layer is an adhesive principal surface (X) satisfying the requirement (2), particularly when the material constituting a base material in contact with the principal surface of a resin layer includes a metal, a metal oxide, or glass.

The base material composed of a metal, a metal oxide, and a glass, has an OH group on the surface, and the OH group reacts with, for example, an amino-based silane coupling agent preferably contained in a resin composition used in forming a resin layer on a base material, thereby making it possible to improve adhesiveness at the interface between a base material and a resin layer.

As described later, the constituent material of a nozzle plate 20 is preferably a metal, and from the above viewpoint, in an ink ejection device of the present invention, it is preferable that the principal surface on the side of the nozzle plate 20 in an adhesive layer 2 bonding an actuator Ac and the nozzle plate 20 is an adhesive principal surface (X).

A flow path substrate 3A included in an actuator Ac is a wiring board having wiring electrodes 33A and 33B (see FIG. 6), and an ink ejection device 100 includes a flexible substrate 8 (see FIG. 6) connected to the wiring electrode of the flow path substrate 3A and a driving circuit substrate (not shown) connected to the flexible substrate 8, above the actuator Ac. The ink ejection device 100 includes a chassis 6 that houses lower members (such as a nozzle plate 20, an actuator Ac, and a manifold 5), and a covering member 7 attached to the chassis 6 so as to cover upper members (such as a flexible substrate 8 and a driving circuit substrate).

A chassis 6 is, for example, a member formed by die casting method using aluminum as a material, and is formed to be long in the crosswise direction. The bottom surface of the chassis 6 has an open end such that a nozzle plate 20 is exposed to the outside. At both ends in the crosswise direction of the chassis 6, mounting holes 68 for mounting the chassis 6 to the printer body side are formed.

The lower end part of a manifold 5 is attached and fixed by bonding to the outer edge part of an upper surface 3Sb of a flow path substrate 3A. The bonding can be performed, for example, by forming an adhesive layer. In this case, one or both of the principal surfaces of an adhesive layer may be an adhesive principal surface (X) when the adhesive layer has a part in direct contact with an ink flow path, for example, a side surface in direct contact with an ink flow path.

The manifold 5 is, for example, a member molded from resin, disposed on the upper side of a flow path substrate 3A of an actuator Ac, and has a function of storing ink supplied to the actuator Ac. Specifically, as shown in FIG. 3 and the like, a manifold 5 is formed of a resin material to be long in the crosswise direction and includes, for example, a main body part 52 having a hollow shape which constitutes an ink storage part 51, and first to third ink ports 53 to 55 which constitute an ink flow path. In addition, the ink storage part 51 is divided into two parts, a first liquid chamber 51*a* on the upper side and a second liquid chamber 51*b* on the lower side, by a filter F for removing dust in the ink.

The first ink port 53 is communicated with the upper end of the right side of the first liquid chamber 51*a*, and is used to introduce ink into the ink storage part 51. A first joint 81*a* is fitted from outside to the distal end of the first ink port 53. The second ink port 54 is communicated with the upper end of the left side of the first liquid chamber 51*a*, and is used to remove air bubbles in the first liquid chamber 51*a*.

In addition, a second joint 81*b* is fitted from outside to the distal end of the second ink port 54. The third ink port 55 is communicated with the upper end of the left side of the second liquid chamber 51*b*, and is used to remove air bubbles in the second liquid chamber 51*b*. A third joint 82*a* is fitted from outside to the distal end of the third ink port 55. The manifold 5 may further include a fourth ink port (not shown) as an ink outlet for discharging excess ink that has not been used for printing to be discharged from the actuator Ac to the outside of the ink ejection device 100.

A nozzle plate 20 is disposed below a pressure chamber substrate 1A of the actuator Ac. The material constituting the nozzle plate 20 can be selected from, for example, materials having high mechanical strength, ink-resistance, and excellent dimensional stability, and for example, various materials such as inorganic materials and resin films can be used. The material constituting the nozzle plate 20 is preferably an inorganic material such as a metal oxide or a metal, more preferably a metal such as iron (e.g., stainless steel (SUS)), aluminum, nickel, or stainless, and particularly preferably stainless steel (SUS). The nozzle plate 20 has nozzles 21A and 21B that serve as an ink ejection hole when ink is ejected from a pressure chamber substrate 1A toward a recording medium.

As shown in FIG. 6, the pressure chamber substrate 1A included in the actuator Ac is a substantially quadrangular prism-shaped member that is long in the crosswise direction, and has two channel rows of the A row and the B row. Here, the channel row on the rear side shown in FIG. 6 is referred to as the A row, and the channel row on the front side shown in FIG. 6 is referred to as the B row. The channel rows are constituted by alternately arranging driving channels 11A and 11B and dummy channels 12A and 12B, respectively. The partition wall between the adjacent a driving channel 11A or 11B and a dummy channel 12A or 12B is a driving wall 13 made of a piezoelectric body.

The piezoelectric body preferably includes, for example, a perovskite-type compound represented by barium titanate ($BaTiO_3$) and lead-zirconate titanate ([$Pb(Zr{\cdot}Ti)O_3$], also referred to herein as "PZT"), and preferably mainly include PZT. Incidentally, the content ratio of Zr and Ti in PZT is preferably Zr/Ti=30/70 to 70/30 in molar ratio. The term "mainly include PZT" means that PZT is 85% by mass or more relative to the total amount of a piezoelectric body.

In order to improve the performance of the piezoelectric body, a donor ion may be added to PZT, and examples of the donor ion include metal ions such as lanthanum (La), niobium (Nb), tantalum (Ta), tungsten (W), aluminum (Al), and strontium (Sr), and preferably include one or more ions selected from the group consisting of La, Nb, Ta, and W. An acceptor ion preferably includes one or more metal ions selected from the group consisting of iron (Fe), cobalt (Co) and manganese (Mn).

In the present specification, a driving channel is a channel that serves as an ink flow path for ejecting ink according to the image data at the time of image recording. A dummy channel is a channel that does not always eject ink regardless of the image data. The dummy channel does not need to eject ink, and therefore is not filled with ink. The dummy channel is usually filled with a gas such as air.

Figure 7:
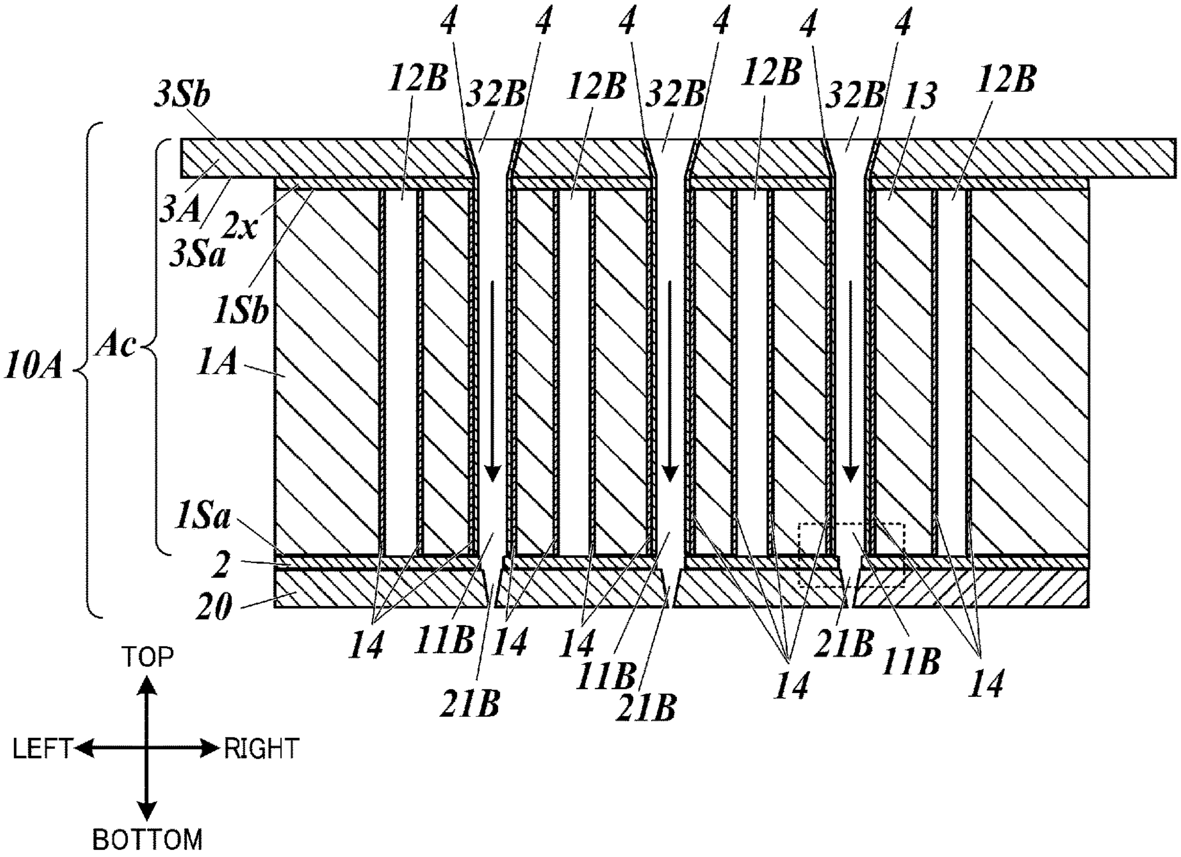
FIG. 7 This is a cross-sectional view taken along the line VII-VII in FIG. 6.

As shown in FIG. 6 and FIG. 7, which is a cross-sectional view taken along a line VII-VII of FIG. 6, each driving channel 11A and 11B and each dummy channel 12A and 12B are opened at a lower surface 1Sa and an upper surface 1Sb of a pressure chamber substrate 1A, respectively, and are straight across the lower surface 1Sa and the upper surface 1Sb, and are formed in a rectangular cross section perpendicular to the thickness direction, that is, in a quadrangular prism shape. Note that the cross-sectional view of FIG. 7 shows a cross section of a channel row of the B row, but a cross section of a channel row of the A row is the same, and in the following description, the channel rows of the A row and B row will be described with reference to FIG. 7. The same applies to FIG. 8.

On the surfaces of four walls facing the inside of each driving channel 11A and 11B and each dummy channel 12A and 12B, driving electrodes 14 are formed on each surface, and further, on the entire surface of the driving electrode 14 facing driving channels 11A and 11B, a protective film 4 is formed.

A protective film 4 is formed on the entire surface of the wall facing through-holes 32A and 32B in a flow path substrate 3A and the entire surface of the wall facing a through-hole in an adhesive layer 2. The through-holes 32A and 32B (first ink flow path) of a flow path substrate 3A, the through-hole of an adhesive layer 2, and driving channels 11A and 11B (second ink flow path) are in communication with each other and serve as an ink flow path of an actuator Ac.

Connecting electrodes (not shown) are formed on the upper surface 1Sb of a pressure chamber substrate 1A so as to correspond to driving channels 11A and 11B and dummy channels 12A and 12B in a one-to-one manner. One end of each connecting electrode is in electrical communication with a driving electrode 14 in the corresponding driving channels 11A and 11B or dummy channels 12A and 12B.

The actuator Ac is an independently-driven actuator in which driving channels 11A and 11B and dummy channels 12A and 12B are alternately arranged in the respective channel rows of a pressure chamber substrate 1A, and a driving wall 13 is shear-deformed by applying a drive signal of a predetermined voltage to the driving electrode 14. Thereby, the ink supplied into the driving channels 11A and 11B is given a pressure change for ejection, and is ejected as droplets of ink from nozzles 21A and 21B of a nozzle plate 20 which is bonded on the lower surface of the actuator Ac, that is, on the lower surface 1 Sa of the pressure chamber substrate 1A via an adhesive layer 2.

Figure 8:
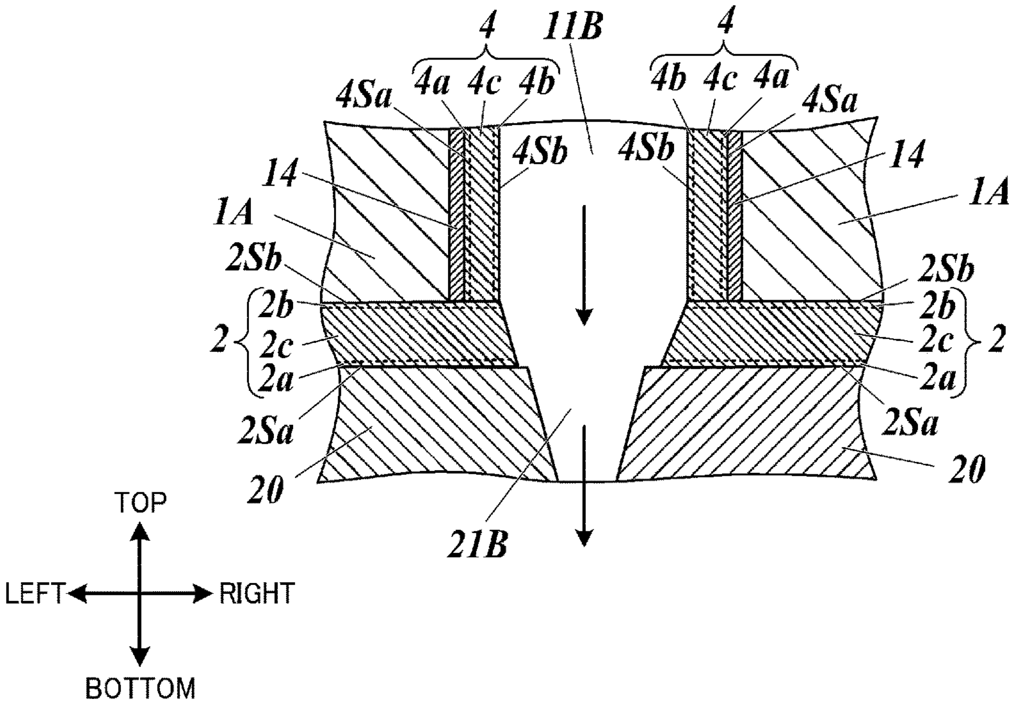
FIG. 8 This is an enlarged view of a part enclosed by a dashed line in FIG. 7.

As shown in FIG. 7 and FIG. 8, an adhesive layer 2 is a resin layer for bonding a nozzle plate 20 and a pressure chamber substrate 1A, and is disposed to face a driving channel 11B whose side surface is an ink flow path. The adhesive layer 2 has a first principal surface 2Sa on the nozzle plate 20 side and a second principal surface 2Sb on the pressure chamber substrate 1A side, and, preferably at least the first principal surface 2Sa, more preferably both the first principal surface 2Sa and the second principal surface 2Sb, corresponds to an adhesive principal surface (X) which satisfies the requirement (2) of the present invention in relation to the interior 2*c*.

The adhesive layer 2 is preferably a layer formed using a curable resin as a resin, and more preferably a layer formed using the epoxy resin composition. The adhesive layer 2 can function as an adhesive layer by setting the thickness to the range of 0.1 to 5 μm, for example. The adhesive layer 2 is, for example, a configuration corresponding to a resin layer shown in FIG. 2.

On the nozzle plate 20, nozzles 21A and 21B are provided at the positions corresponding to the driving channels 11A and 11B of a pressure chamber substrate 1A. Since the ink is not ejected from dummy channels 12A and 12B, the nozzle plate 20 does not have a nozzle at the positions corresponding to the dummy channels 12A and 12B. Therefore, an open end on the lower side of the dummy channels 12A and 12B is closed by the nozzle plate 20.

The other ends of the connecting electrodes corresponding to a driving channel 11A and a dummy channel 12A in the A row extend from inside channels 11A and 12A toward one end edge in the upper surface 1Sb of the pressure chamber substrate 1A, and stop at a distance of about 200 μm from the end edge. In addition, the other ends of the connecting electrodes corresponding to a driving channel 11B and a dummy channel 12B in the B row extend from inside channels 11B and 12B toward the A row side, and stop at a distance of about 200 μm from the channel row in the A row. Thus, all of the connecting electrodes extend from the channels 11A, 11B, 12A, and 12B toward the same direction.

The driving electrode 14 and the connecting electrode are made of a conductive material. Specific examples of the conductive material include conductive materials containing one or more of metals such as platinum (Pt), gold (Au), copper (Cu), palladium (Pd), ruthenium (Ru), titanium (Ti), nickel (Ni), aluminum (Al), chrome (Cr), tungsten (W), and iridium (Ir). The conductive material can be a material containing one or more of these metals. The conductive material may be a mixture of metals or an alloy. In the case, it may be a mixture of at least one of the metals and other metals or an alloy.

A flow path substrate 3A is a flat plate-shaped substrate having a lower surface 3Sa and an upper surface 3Sb having an area larger than the area of the upper surface 1Sb of the pressure chamber substrate 1A. In the flow path substrate 3A, a junction region 31 (indicated by a dashed line in FIG. 6) on the lower surface 3Sa is bonded to the upper surface 1Sb of the pressure chamber substrate 1A via an adhesive layer 2X. At least one end of the flow path substrate 3A after bonding extends outward of the junction region 31 to which the pressure chamber substrate 1A is bonded, and largely extends laterally along the direction in which the channel rows of the pressure chamber substrate 1A are arranged.

The junction region 31 is a region covered by the pressure chamber substrate 1A in which the lower surface 3Sa of the flow path substrate 3A is bonded, and is defined by a line perpendicular to the flow path substrate 3A from the outer peripheral edge of the upper surface 1Sb of the pressure chamber substrate 1A.

As the material of the flow path substrate 3A, appropriate materials such as glasses, ceramics, silicon, and plastics can be used. Among them, glass is preferable from the viewpoint of being moderately rigid, inexpensive, and easy to process.

The flow path substrate 3A is bonded through an adhesive layer 2X so as to cover open ends of all the channels located on the upper surface 1Sb of the pressure chamber substrate 1A in the junction region 31. In the junction region 31 of the pressure chamber substrate 1A in the flow path substrate 3A, through-holes 32A and 32B for supplying ink from the upper surface 3Sb side of the flow path substrate 3A to the respective driving channels 11A and 11B are separately provided only at the position corresponding to driving channels 11A and 11B of the pressure chamber substrate 1A.

The through-holes 32A and 32B are formed so that an open end of the pressure chamber substrate 1A side, that is, an open end on the lower surface 3Sa of the flow path substrate 3A, is the same size and shape as an open end of the flow path substrate 3A side of the driving channels 11A and 11B, that is, an open end on the upper surface 1Sb of the pressure chamber substrate 1A, respectively. In the actuator Ac, the through-holes 32A and 32B included in the flow path substrate 3A have a cross section that expands from the lower surface 3Sa of the flow path substrate 3A toward the upper surface 3Sb.

On the other hand, in the flow path substrate 3A, such a through-hole is not formed at the position corresponding to the dummy channels 12A and 12B of the pressure chamber substrate 1A. For this reason, open ends on the upper side (flow path substrate 3A side) of the dummy channels 12A and 12B are blocked by the flow path substrate 3A.

On the surface (lower surface) 3Sa of the flow path substrate 3A, which is a bonding surface with the pressure chamber substrate 1A, wiring electrodes 33A and 33B are formed so as to correspond one-to-one to the connecting electrodes arranged on the upper surface 1Sb of the pressure chamber substrate 1A. The wiring electrode 33A corresponds to each connecting electrode of the channel rows of the A row, and the wiring electrode 33B corresponds to each connecting electrode 15B of the channel rows of the B row. The wiring electrodes 33A and 33B are made of a conductive material. Examples of the conductive material include the same conductive materials as those described above.

As shown in FIG. 6, one end of the wiring electrode 33A reaches the vicinity of the corresponding driving channel 11A and dummy channel 12A and overlaps with the corresponding connecting electrode in a plan view from above, and the other end extends toward the rear end of the flow path substrate 3A extending laterally of the pressure chamber substrate 1A. In addition, one end of the wiring electrode 33B reaches the vicinity of the corresponding driving channel 11B and dummy channel 12B and overlaps the corresponding connecting electrodes in a plan view viewed from above, and the other end extends across the channel row of the A row through the adjacent driving channels 11A and 11A of the channel row of the A row, and extends toward the rear end of the flow path substrate 3A, similar to the wiring electrode 33A. For this reason, on the lower surface 3Sa of the flow path substrate 3A extending laterally of the pressure chamber substrate 1A, wiring electrodes 33A and 33B are arranged so as to be alternated from the inside to the rear end of the junction region 31.

A flexible substrate 8, which is an exemplary external wiring member, is connected to the rear end of the flow path substrate 3A via, for example, an ACF (anisotropy conductive film), and electrically connects to a drive circuit (not shown). Thereby, a drive signal of a predetermined voltage from the driving circuit is applied to a driving electrode 14 in each channel 11A, 11B, 12A, and 12B via the flexible substrate 8, the wiring electrodes 33A and 33B of the flow path substrate 3A, and the connecting electrode of the pressure chamber substrate 1A.

The wiring electrodes 33A and 33B extending from within the junction region 31 to the rear end of the flow path substrate 3A is covered with an insulating film 34 having a predetermined width on the outer side of the junction region 31. As shown in FIG. 6, an edge 34*a* on the junction region 31 side of the insulating film 34 is formed so as to be in contact with a rear edge part of the junction region 31 and formed in a straight line along the edge part. The width of the insulating film 34 preferably extends from the outside of the junction region 31 to the connecting position with the flexible substrate 8. In this way, wiring electrodes 33A and 33B can prevent short-circuiting between the wiring electrodes 33A and 33B due to protruding of the conductive adhesive, short-circuiting due to stain or sticking of ink or the like of the wiring electrodes 33A and 33B, and the like, by covering the vicinity of the junction region 31 by the insulating film 34. Examples of the constituent material of the insulating film 34 include $TiO_2$, $SiO_2$, and $Al_2O_3$.

An adhesive layer 2X that bond a pressure chamber substrate 1A and a flow path substrate 3A has a through-hole for communicating driving channels 11A and 11B of the pressure chamber substrate 1A and through-holes 32A and 32B of the flow path substrate 3A. The through-hole has, on the pressure chamber substrate 1A side, an open end having the same size and shape as an open end on the upper surface 1Sb of the driving channels 11A and 11B, and on the flow path substrate 3A side, an open end having the same size and shape as an open end on the lower surface 3Sa of through-holes 32A and 32B.

In the actuator Ac, the adhesive layer 2X is a conductive adhesive layer made of a conductive adhesive. Since the adhesive layer 2X is conductive, electrical connection between the connecting electrode of the pressure chamber substrate 1A and the wiring electrodes 33A and 33B of the flow path substrate 3A, which are bonded via the adhesive layer 2X, can be possible. The thickness of the adhesive layer 2X is preferably in the range of 0.1 to 5 μm, for example. Note that the side surface of the adhesive layer 2X is covered with a protective film 4 and the adhesive layer 2X is not in contact with a driving channel 11B to be an ink flow path. Therefore, the adhesive layer 2X may not be an adhesive layer having an adhesive principal surface (X) according to the present invention. However, the adhesive layer 2X may be an adhesive layer having an adhesive principal surface (X) according to the present invention.

As the conductive adhesive, for example, an adhesive in which conductive particles are dispersed is used. As the adhesive, a normal temperature curable adhesive that is cured at normal temperature, a thermosetting adhesive that is cured by accelerating polymerization by heating, an active energy ray curable adhesive that is cured by accelerating polymerization by irradiating with active energy rays such as UV rays, and the like can be used.

Among them, a thermosetting adhesive is preferable. The thermosetting adhesive is preferable in that when it is heated to a predetermined temperature for curing after bonding, the viscosity of the adhesive temporarily decreases, making it easier to flow, and the obtained adhesive layer is uniform in thickness. As the thermosetting adhesive, an epoxy-based adhesive is preferably used, but is not particularly limited.

As the conductive particles, in addition to the metal particles themselves such as Au and Ni, there are those coated with a metal film such as Au or Ni on the surface of the synthetic resin particles by plating or the like, and any of them can be used in the present invention.

In an actuator Ac, a driving electrode is formed on a wall surface facing the channels of partition wall of a pressure chamber substrate, and the adhesive constituting the adhesive layer as described above is a conductive adhesive in order to electrically connect the driving electrode and a wiring electrode of a flow path substrate. However, in an actuator according to the present invention, a driving electrode may not necessarily be formed on the wall surface of partition wall facing the respective channels as long as it is arranged so as to drive the partition wall. That is, an adhesive layer may not require conductivity. In that case, an adhesive layer can be, for example, an adhesive layer formed of an adhesive that does not contain conductive particulates in the conductive adhesive.

As shown in FIG. 7, a protective film 4 of the actuator Ac is formed on the entire surface of the wall surface of laminated substrate facing an ink flow path that communicates the laminated substrate in which a flow path substrate 3A and a pressure chamber substrate 1A are bond by an adhesive layer 2X. The wall surface facing an ink flow path of the laminated substrate is constituted by each wall facing an ink flow path of a flow path substrate 3A, an adhesive layer 2X and a pressure chamber substrate 1A.

A protective film 4 is a resin layer. As the resin contained in the protective film 4, for example, a polyimide resin or a polyparaxylylene resin is preferable, and a polyparaxylylene resin is preferable. The polyparaxylylene resin is specifically composed of polyparaxylylene or a derivative thereof. Examples of the derivative include compounds in which one or more of the hydrogen atoms bonded to the benzene ring of the polyparaxylylene is substituted with a halogen atom such as fluorine, chlorine, or bromine, or an alkyl group.

A thin film made of polyparaxylylene or a derivative thereof is called parylene film, and can be formed by a vapor phase synthesizing method, so-called CVD (Chemical Vaper Deposition) method using a dimer (solids) of paraxylylene or a derivative thereof as a deposition source. A protective film 4 can be a resin layer having an adhesion principal surface (X) according to the present invention. In that case, a base material is a driving electrode 14 or a pressure chamber substrate 1A, and the adhesion principal surface (X) is in contact with a driving electrode 14 or a pressure chamber substrate 1A.

When a protective film 4 is a resin layer having an adhesion principal surface (X) according to the present invention, the resin-composition used in forming a protective film 4 preferably contains an amino-based silane-coupling agent. In the parylene film, since the para-xylylene is composed only of carbon and hydrogen, components including oxygen, nitrogen, and silicon may be used as the derivative. However, in order to obtain a protective film 4 as a a resin layer having an adhesion principal surface (X) in contact with a base material (the requirement of (1)) and satisfying the requirement (2), it is preferable to use an amino-based silane coupling agent that contains at least oxygen, nitrogen, and silicon.

In case the thickness of a protective film 4 is, for example, in the range of 0.1 to 15 μm, it can function as a protective film. A protective film 4 is, for example, a configuration corresponding to a resin layer shown in FIG. 1.

FIG. 8 is an enlarged view of a portion surrounded by a broken line in the cross-sectional view of FIG. 7. Specifically, it is an enlarged view of a part around a nozzle 21B where a pressure chamber substrate 1A and a nozzle plate 20 are bonded through an adhesive layer 2.

In FIG. 8, as indicated by the arrows, the ink is ejected from a driving channel 11B through a nozzle 21B toward a recording medium that is located at the outside of an ink ejection device 100. That is, in FIG. 8, a driving channel 11B and a nozzle 21B are an ink flow path, and members having the same configuration are symmetrically arranged on both sides of an ink flow path.

In FIG. 8, the relationship among a pressure chamber substrate 1A, an adhesive layer 2 and a nozzle plate 20 is similar to the relationship among a base material B1, a resin layer P and a base material B2 in FIG. 2. An adhesive layer 2 has a first principal surface 2Sa in contact with the upper surface of the nozzle plate 20 and a second principal surface 2Sb in contact with the lower surface of the pressure chamber substrate 1A. An adhesive layer 2 is composed of a first surface portion 2*a* consisting of a region from the first principal surface 2Sa to a predetermined depth starting from the first principal surface 2Sa, a second surface portion 2*b* consisting of a region from the second principal surface 2Sb to a predetermined depth starting from the second principal surface 2Sb, and an interior 2*c* consisting of a region other than the surface portions 2*a*, 2*b*.

In an adhesive layer 2, as described above, preferably at least the first principal surface 2Sa, more preferably both the first principal surface 2Sa and the second principal surface 2Sb correspond to, in relation to the interior 2*c*, the adhesion principal surface (X) which meets the requirements of (2) of the present invention.

In FIG. 8, the relationship between a pressure chamber substrate 1A with a driving electrode 14 and a protective film 4 is the same as the relationship between a base material B and a resin layer P in FIG. 1. However, FIG. 8 is different from FIG. 1 in that a pressure chamber substrate 1A has a driving electrode 14, and a protective film 4 is formed on the ink-flow-path-side surface of a driving electrode 14. A protective film 4 has a first principal surface 4Sa in contact with the ink-flow-path-side surface of a driving electrode 14 and a second principal surface 4Sb in contact with an ink flow path. A protective film 4 is composed of a first surface portion 4*a* consisting of a region from the first principal surface 4Sa to a predetermined depth starting from the first principal surface 4Sa, a second surface portion 4*b* consisting of a region from the second principal surface 4Sb to a predetermined depth starting from the second principal surface 4Sb, and an interior 4*c* consisting of a region other than the surface portions 4*a*, 4*b*. In a protective film 4, as mentioned above, the first principal surface 4Sa preferably corresponds to an adhesion principal surface (X) which meets the requirement (2) of the present invention in relation to the interior 4*c*.

The shear-mode actuator Ac and an ink ejection device of the present invention having the same have been described with reference to a head chip 10A. In the following, referring to FIGS. 9 and 10, an ink ejection device of the present invention having a bend-mode actuator Ab will be described.

Figure 9:
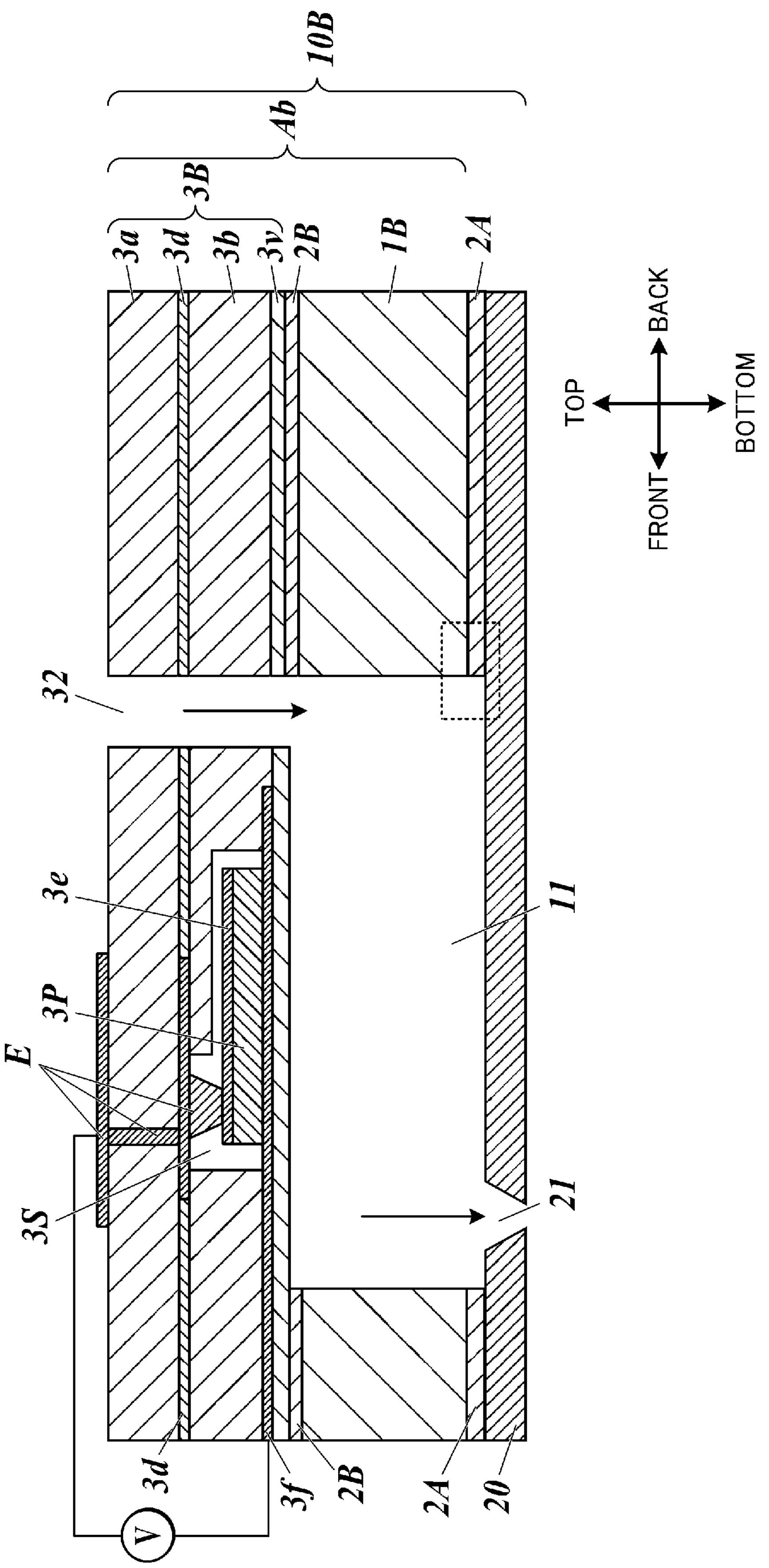
FIG. 9 This is a local sectional view of another exemplary embodiment of an ink ejection device of the present invention.

FIG. 9 is a partial cross-sectional view of another embodiment of an ink ejection device of the present invention. FIG. 9 shows a cross-sectional view of a head chip 10B in an ink ejection device. A head chip 10B has a nozzle plate 20 bonded to an actuator Ab and an actuator Ab via an adhesive layer 2A. The actuator Ab is a bend mode actuator. FIG. 10 is an enlarged view of a part of an ink ejection device shown in FIG. 9 surrounded by a broken line including a pressure chamber substrate 1B, an adhesive layer 2A, nozzle plates 20 and pressure chambers 11 which constitute the lower part of the actuator Ab.

The actuator Ab includes a wiring board 3*a*, an adhesive layer 3*d*, a flow path substrate 3B to which a spacer plate 3*b* and a diaphragm 3*v* are laminated, an adhesive layer 2B located below the flow path substrate 3B, and a pressure chamber substrate 1B bonded to the flow path substrate 3B via the adhesive layer 2B sequentially from top to bottom. A spacer substrate 3*b* has a hollow portion, and has a piezoelectric element in which an upper electrode (a driving electrode) 3*e*, a piezoelectric body 3P, and a lower electrode (a driving electrode) 3*f* are laminated sequentially from top to bottom inside the hollow portion. The part other than a piezoelectric element in the hollow portion is a space 3S.

The upper electrode 3*e* of the piezoelectric element is connected to an external power source by a plurality of wiring conductors E electrically connected from a spacer plate 3*b* to a wiring board 3*a*. The lower electrode 3*f* is connected to an external power source via a separate path. A piezoelectric body 3P is driven by application of a voltage by the upper electrode 3*e* and the lower electrode 3*f*. As a result, a diaphragm 3*v* is curved downward.

A diaphragm 3*v* is bonded to a pressure chamber substrate 1B located below a piezoelectric element via an adhesive layer 2B. On the lower side of a pressure chamber substrate 1B, a nozzle plate 20 having a nozzle 21 is bonded to the pressure chamber substrate 1B via an adhesive layer 2A. The nozzle plate 20 can be made of the same material as a nozzle plate bonded to the actuator Ac.

A pressure chamber substrate 1B has a pressure chamber (a driving channel) 11 in which an ink is contained, and a nozzle 21 communicates with the pressure chamber 11. When a piezoelectric element is driven, the volume of the pressure chamber 11 is reduced by a diaphragm 3*v* curved, so that the ink contained in the pressure chamber 11 is discharged from the nozzle 21.

A flow path substrate 3B and an adhesive layer 2B have a a through-hole 32 that provides an ink flow path in communication with a pressure chamber 11 of a pressure chamber substrate 1B. An ink is supplied from the upper side of an actuator Ab through a through-hole 32 to the chamber 11. An ink flow path in a head chip 10B is constituted by a through-hole 32, a pressure chamber 11, and a nozzle 21.

Component materials of a wiring board 3*a*, a spacer substrate 3*b*, and a pressure chamber substrate 1B in a flow path substrate 3B of an actuator Ab may be, for example, SUS, nickel, 42 alloy, silicon (Si), or the like. Conductive materials constituting a piezoelectric body of a piezoelectric body 3P, an upper electrode (a driving electrode) 3*e*, a lower electrode (a driving electrode) 3*f*, and a wiring conductor, and the like can be the same materials as those described in the actuator Ac.

As a diaphragm 3*v*, a common diaphragm used in a vent-mode actuator can be used without any particular limitation.

Each of an adhesive layer 3*d*, an adhesive layer 2B, and an adhesive layer 2A is an adhesive layer formed between base materials, and has a side surface in contact with an ink flowing through an ink flow path. Each of an adhesive layer 3*d*, an adhesive layer 2B, and an adhesive layer 2A can have the same configuration as that of an adhesive layer 2 described in a head chip 10A. In particular, it is preferable that an adhesive layer 2A for bonding a pressure chamber substrate 1B and a nozzle plate 20 have the same configuration as that of an adhesive layer 2.

Figure 10:
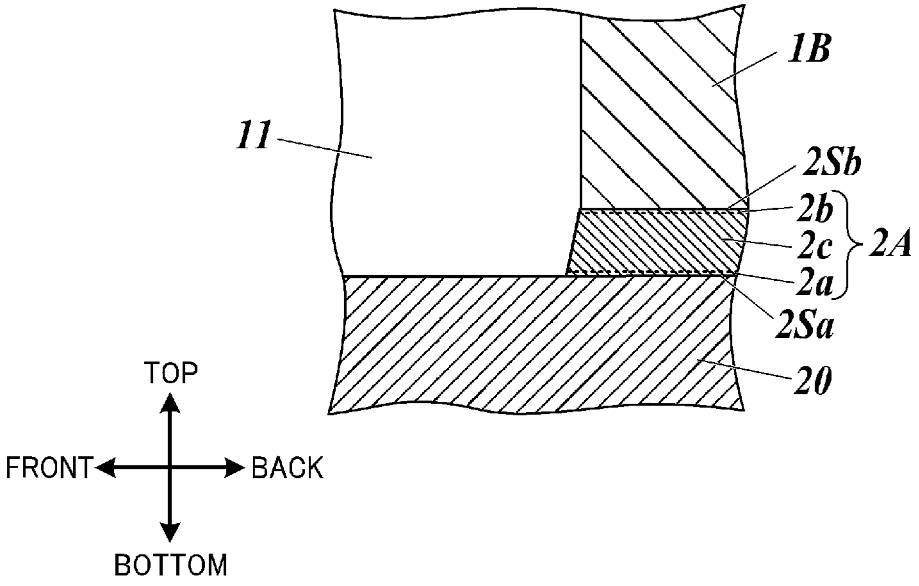
FIG. 10 This is an enlarged view of a part enclosed by a dashed line of an ink ejection device shown in FIG. 9.

The enlarged cross-sectional view shown in FIG. 10 corresponds to FIG. 2. In FIG. 10, the relationship among a pressure chamber substrate 1B, an adhesive layer 2A and a nozzle plate 20 is similar to the relationship among a base material B1 and a resin layer P and a base material B2 in FIG. 2. An adhesive layer 2A has a first principal surface 2Sa in contact with an upper surface of a nozzle plate 20 and a second principal surface 2Sb in contact with a lower surface of a pressure chamber substrate 1B. An adhesive layer 2A is composed of a first surface portion 2*a* consisting of a region from the first principal surface 2Sa to a predetermined depth starting from the first principal surface 2Sa, a second surface portion 2*b* consisting of a region from the second principal surface 2Sb to a predetermined depth starting from the second principal surface 2Sb, and an interior 2*c* consisting of a region other than the surface portions 2*a*, 2*b*.

In an adhesive layer 2A, as described above, preferably at least the first principal surface 2Sa, more preferably both the first principal surface 2Sa and the second principal surface 2Sb, corresponds to the adhesion principal surface (X) satisfying the requirement (2) of the present invention, in relation to the interior 2*c*.

Ink

As an ink used in an ink ejection device of the present invention, an ink for ink jet recording is applied without any particular limitation. An ink ejection device of the present invention has an excellent interface for ink resistance, in which the interface with a base material of a resin layer formed on the base material or between the base materials, and it exhibits good effects regardless of the kind of the ink.

Specifically, it is highly effective when an aqueous ink containing components such as water, a coloring material, a dispersing agent, a surfactant, a preservative, a humectant, and a glycol-based solvent is used. The present invention also has an effect in the case of an active ray-curable ink, for example, an ink containing at least an active ray-polymerizable compound, a polymerization initiator, and a coloring material. Examples of the active-ray polymerizable compound include a photocationic polymerizable compound and a photoradical polymerizable compound, and examples of the polymerization initiator include a photocationic polymerization initiator and a photoradical polymerization initiator, respectively.

The present invention is particularly effective when an ink containing at least one compound having at least one group selected from a carboxylic acid group, a sulfonic acid group, and a phosphonic acid group, or at least one anion selected from a $SO_4^{2-}$, $PO_4^{3-}$, $B(C_6F_5)_4^-$, $SbF_6^-$, $PF_6^-$, $BF_4^-$, $CF_3SO_3^-$, and a $C_4F_9SO_3^-$ is used. These compounds and anions include, for example, those derived from colorants. In addition, $B(C_6F_5)_4^-$, $SbF_6^-$, $PF_6^-$, $BF_4^-$, $CF_3SO_3^-$, and $C_4F_9SO_3^-$ and the like include those derived from a photocationic polymerization initiator.

As described above, an ink ejection device of the present invention is excellent in ink resistance at the interface with a base material of a resin layer formed on a base material or between base materials even when an ink comprising at least one compound having at least one group selected from a carboxylic acid group, a sulfonic acid group, and a phosphonic acid group, or at least one anion selected from a $SO_4^{2-}$, $PO_4^{3-}$, $B(C_6F_5)_4^-$, $SbF_6^-$, $PF_6^-$, $BF_4^-$, $CF_3SO_3^-$, and a $C_4F_9SO_3^-$ is used.

EXAMPLE

Hereinafter, the present invention will be described in detail with reference to examples, but the present invention is not limited thereto.

Experimental Example

A resin layer was formed between two SUS substrates in the following manner, and the atomic compositions of the adhesion principal surface and the interior of the resin layer were measured by XPS.

(Preparation of Resin Composition)

Specifically, each resin composition for examples 1-3 and comparative example 1 whose composition was shown in Table 1 was prepared. jER828 (bisphenol A type epoxy compound, epoxy equivalent weight 184-194, weight average molecular weight 370) and jER152 (phenol novolac type epoxy compound, epoxy equivalent weight 176-178, weight average molecular weight 370) are both epoxy compounds manufactured by Mitsubishi Chemical Corporation. Also, in 2-ethyl-4-methylimidazole, pKa of $H^+$ adduct at 25° C. is 8.3.

TABLE 1

TABLE I

| COMPOUND | COMPOSITION (PARTS BY MASS) EXAMPLE 1 | EXAMPLE 2 | EXAMPLE 3 | COMPARATIVE EXAMPLE 1 |
|---|---|---|---|---|
| jER828 | 4 | 4 | 4 | 4 |
| jER152 | 1 | 1 | 1 | 1 |
| 2-ETHYL-4-METHYLIMIDAZOLE | 0.5 | 0.5 | 0.5 | 0.5 |
| 3-AMINOPROPYLTRIMETHOXYSILANE | 0.1 | 0.0125 | 0.05 | — |
| 3-GLYCIDOXYPROPYLTRIMETHOXYSILANE | — | — | — | 0.1 |

(Preparation of Laminated Samples)

As two SUS substrates, a nozzle plate substrate made of SUS304 (thickness; 0.05 mm) (SUS substrate arranged with 1000 nozzle) and a flow path plate substrate made of SUS304 (SUS substrate arranged with an ink flow path) were used. First, the resin composition for example 1 obtained above was coated on the nozzle plate substrate, and the flow path plate substrate was laminated thereon, subjected to a constant weight, and heat-cured at 100° C. for 1 hour to form a resin layer (thickness: 1.5 μm) between the two SUS substrates and prepare a laminated sample. Resin layers were formed between the two SUS substrates in the same manner as described above using the respective resin compositions other than the resin composition for example 1 to prepare samples.

(1) XPS Depth Profile Measurement

A cutting edge of a cutter knife was inserted between one SUS substrate and a resin layer of laminated samples thus obtained to create a pinched area at the time of peeling, and peeling was performed using tweezers. From the principal surface of the peeled resin layer, XPS depth profile measurement was performed under the following conditions.

<Measurement Conditions>

Analyzer: QUANTERA SXM manufactured by UL VAC-PHI, Inc.

X-ray source: monochromatized Al—Kα 15 kV 25 W

Sputter Ion: Ar (1 keV)

Depth profile: The depth profile in the depth direction is obtained by repeating the measurement at a predetermined thickness interval with $SiO_2$ conversion sputter thickness. This thickness interval is defined as: 10.8 nm for example 1 and comparative example 1, and 11.4 nm for examples 2 and 3 (data per 10.8 nm or per 11.4 nm are obtained in the depth direction).

Determination: The background was obtained by Shirley method, and the obtained peak area was quantified using the relative-sensitivity-coefficient method. Data-processing uses MultiPak manufactured by UL VAC-PHI, Inc.

The atomic concentration of each element in the resin layer was averaged at six locations for each sputter thickness up to the depth 10.8 nm to 64.8 nm or 11.4 nm to 68.4 nm from the principal surface. The measurement was performed at two positions selected at random in the plane direction, and the atomic concentration of each element in the principal surface and the interior was an average value thereof.

Figure 11A:
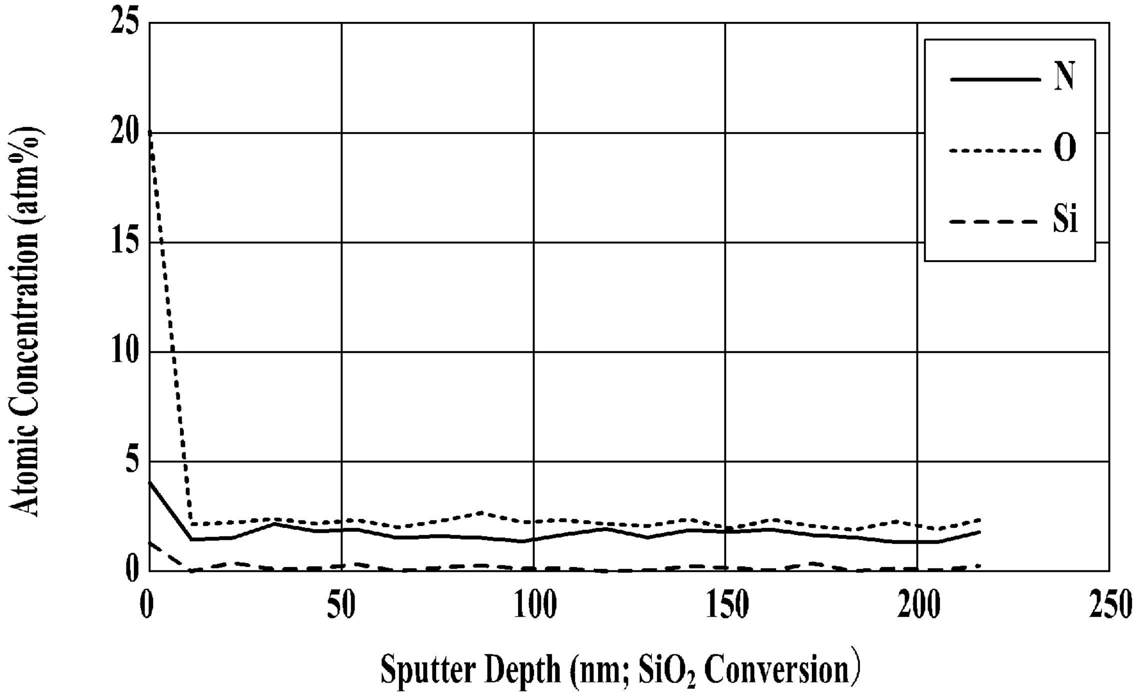
FIG. 11A This is a diagram showing a depth profile by XPS according to Example 1.
Figure 11B:
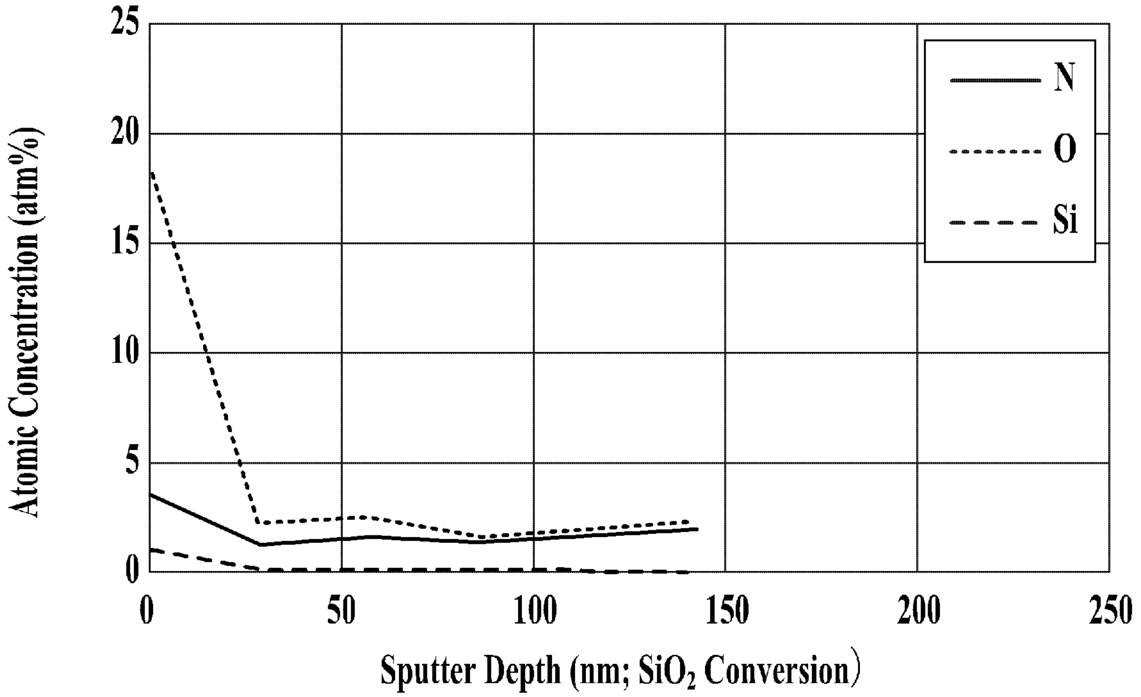
FIG. 11B This is a diagram showing a depth profile by XPS according to Example 2.
Figure 11C:
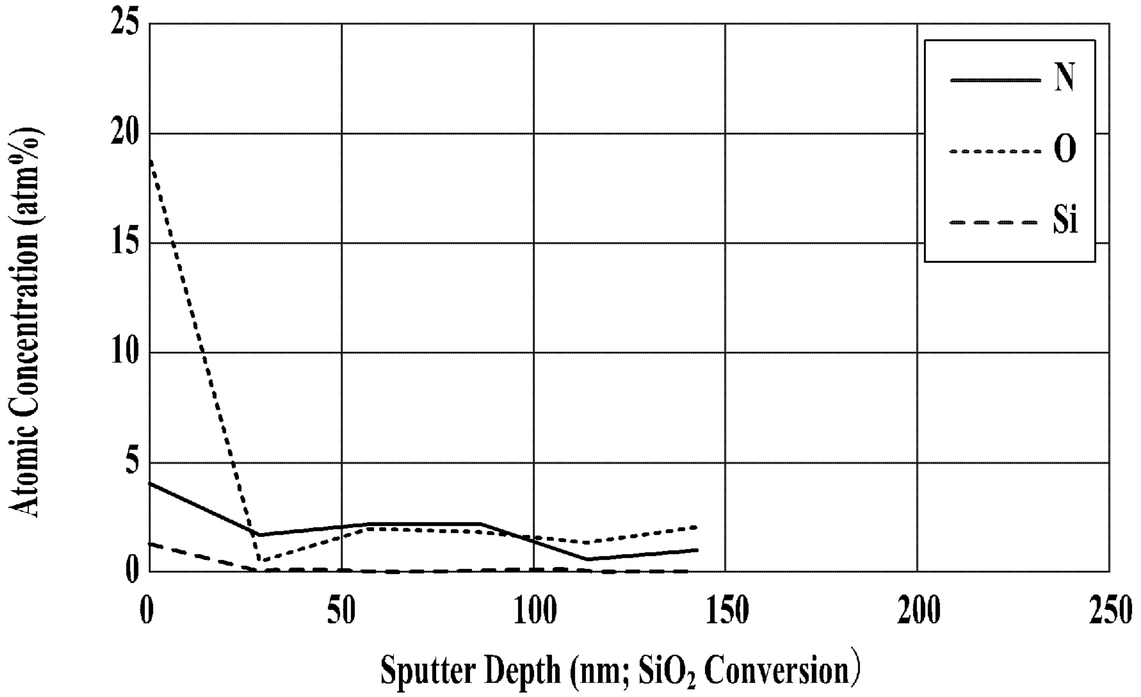
FIG. 11C This is a diagram showing a depth profile by XPS according to Example 3.

From the measurement results of XPS, it was confirmed that any of the above resin layers contained carbon, nitrogen, oxygen, and silicon. In Table II, the atomic concentration (atm %) of the respective elements in all elements is shown for all the elements, i.e., carbon, nitrogen, oxygen, silicon, chromium, and iron. Chromium and iron are components derived from a base material. In addition, the detection limit in the above measurement was 0.1 atm %. In Table II, "ND" indicates that the element was not detected. The depth profiles of nitrogen, oxygen, and silicon in the results of XPS depth profile measurement of Example 1-3 are shown in FIG. 11A to FIG. 11C, respectively.

In addition, for nitrogen, oxygen, and silicon, the principal surface/the interior (the ratio of the atomic concentration of the principal surface to the atomic concentration of the interior) is also shown in Table II.

TABLE 2

TABLE II

| | | ATOMIC CONCENTRATION (atm %) | | | | | | |
|---|---|---|---|---|---|---|---|---|
| | | C | N | O | Si | Cr | Fe | TOTAL |
| EXAMPLE 1 | PRINCIPAL SURFACE | 73.88 | 3.82 | 20.42 | 1.32 | 0.33 | 0.23 | 100.0 |
| | INTERIOR | 93.05 | 1.77 | 2.53 | 0.12 | 0.54 | 2.00 | 100.0 |
| | PRINCIPAL SURFACE/ INTERIOR | — | 2.2 | 8.1 | 10.9 | — | — | — |
| EXAMPLE 2 | PRINCIPAL SURFACE | 76.03 | 3.62 | 18.44 | 1.17 | 0.37 | 0.37 | 100.0 |
| | INTERIOR | 95.12 | 1.66 | 2.16 | 0.10 | 0.31 | 0.64 | 100.0 |
| | PRINCIPAL SURFACE/ INTERIOR | — | 2.2 | 8.5 | 11.5 | — | — | — |
| EXAMPLE 3 | PRINCIPAL SURFACE | 74.55 | 4.17 | 18.76 | 1.36 | 0.43 | 0.74 | 100.0 |
| | INTERIOR | 96.73 | 1.58 | 1.61 | 0.08 | ND | ND | 100.0 |
| | PRINCIPAL SURFACE/ INTERIOR | — | 2.6 | 11.7 | 17.4 | — | — | — |
| COMPARATIVE EXAMPLE 1 | PRINCIPAL SURFACE | 78.11 | 3.31 | 18.38 | 0.20 | ND | ND | 100.0 |
| | INTERIOR | 96.16 | 1.24 | 2.47 | 0.13 | ND | ND | 100.0 |
| | PRINCIPAL SURFACE/ INTERIOR | — | 2.7 | 7.4 | 1.5 | — | — | — |

(2) Analyzing the Binding States of Nitrogen Atoms on the Principal Surface of a Resin Layer by XPS From the laminated samples of example 2 and example 3, the binding states of nitrogen atoms on the principal surface of a resin layer peeled off in the same manner as described above was analyzed by XPS under the following conditions.

<Measurement Conditions>

Analyzer: QUANTERA SXM manufactured by UL VAC-PHI, Inc.

X-ray source: monochromatized Al—Kα 15 kV 25 W

Pass energy: 55 eV

Data-processing: MultiPak manufactured by UL VAC-PHI, Inc. was used.

Analysis of elemental composition: The elemental composition is quantified using the relative-sensitivity-coefficient from the peak area obtained by the background treatment using Shirley method.

Figure 12B:
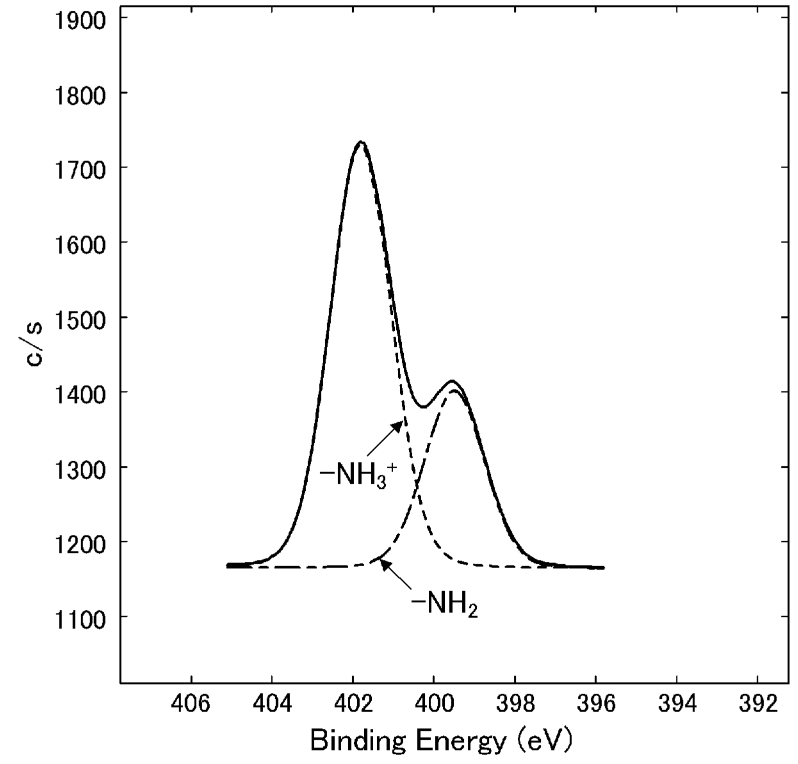
FIG. 12B This is a diagram showing a spectrum obtained by analyzing the binding state of nitrogen atoms by XPS according to Example 2.
Figure 12C:
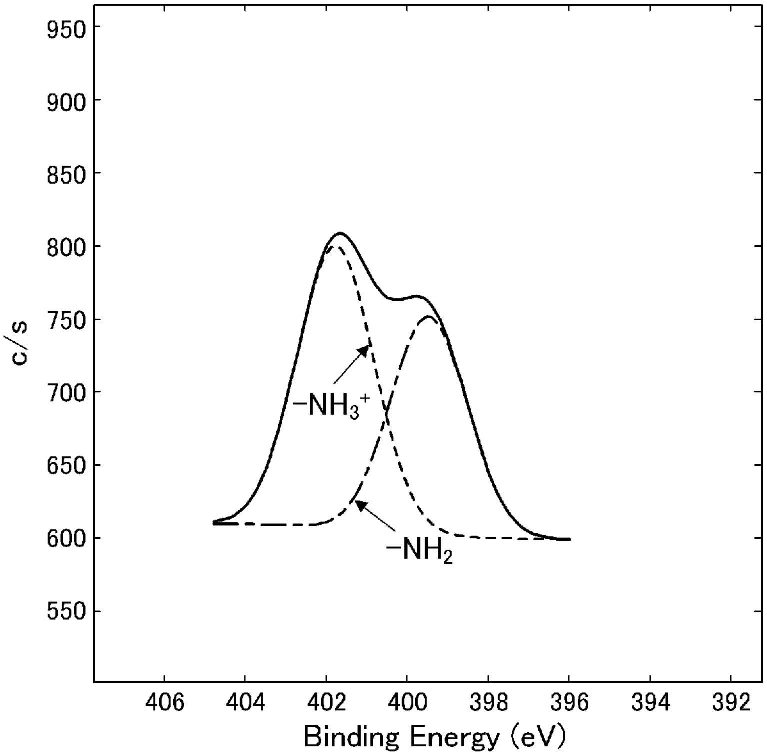
FIG. 12C This is a diagram showing a spectrum obtained by analyzing the binding state of nitrogen atoms by XPS according to Example 3.

In example 1 to example 3, spectral charts in which the peaks related to nitrogen atoms (indicated by solid lines in the drawing) are separated for each peak in each condition are shown in FIG. 12A, FIG. 12B, and FIG. 12C, respectively. FIG. 12A, FIG. 12B and FIG. 12C show that these nitrogen-atom peaks were separated into two peaks, $—NH_2$ and $—NH_3^+$, respectively.

Table III show, for example 1 to example 3, the binding energies (eV) at the peak maxima of $—NH_2$ and $—NH_3^+$, and the ratios of nitrogen atoms derived from $—NH_2$ and nitrogen atoms from $—NH_3^+$ to the total amount of nitrogen atoms determined from the respective peak areas of $—NH_2$ and $—NH_3^+$. In addition, Table III also show values shown in the literature mentioned above.

TABLE 3

TABLE III

| | SPECTRUM | PEAK (MAXIMUM VALUE) POSITION (ev) | | RATIO TO TOTAL N (atm %) | |
|---|---|---|---|---|---|
| | CHART | $—NH_2$ | $—NH_3^+$ | $—NH_2$ | $—NH_3^+$ |
| EXAMPLE 1 | FIG. 12A | 399.5 | 401.8 | 42 | 58 |
| EXAMPLE 2 | FIG. 128 | 399.5 | 401.8 | 30 | 70 |
| EXAMPLE 3 | FIG. 12C | 399.5 | 401.8 | 44 | 56 |
| VALUE SHOWN IN LITERATURE | | 399.0 | 400.6 | — | — |

Evaluation

In the same manner as described above, two laminated samples each of examples and comparative example were prepared, and ink resistance was evaluated using two types of test solutions by the following methods. The results are shown in Table IV.

(Preparation of Real Ink for Evaluation: Dispersive Dye Ink (Test Solution 1))

| <Preparation of dispersion liquid> | |
|---|---|
| Dispersive dye: C.I. Disperse Yellow 160 | 24.0% by mass |
| Diethylene glycol | 30.6% by mass |
| Styrene-maleic anhydride copolymer (dispersing agent) | 12.0% by mass |
| Water | 33.4% by mass |

The mixtures were dispersed using ceramic beads of diameter: 0.5 mm and the sand grinder manufactured by AIMEX CO., LTD. at rotational speed 2500 rpm for 5 hours. Dispersion liquid 1 was prepared by diluting the dispersion liquid with water/diethylene glycol=1:4 so that the dye concentration was 5%.

| <Preparation of real ink> Each composition was added to the dispersion liquid 1 and stirred to prepare a real ink for evaluation (dispersive dye ink). | |
|---|---|
| Dispersion liquid 1 | 20.0% by mass |
| Ethylene glycol | 10.0% by mass |
| Glycerin | 8.0% by mass |
| Emulgen 911 (manufactured by Kao Corporation) | 0.05% by mass |

Ion-exchanged water was added to the above components and finished to 100% by mass to obtain a dispersive dye ink (Test liquid 1). In addition, the liquid properties of the prepared ink were investigated and it was confirmed that the ink was alkaline (pH8.0 or higher).

| (Preparation of real ink for evaluation: reactive dye ink (Test liquid 2)) | |
|---|---|
| C.I. Reactive Yellow | 220 parts |
| Sodium dihydrogen phosphate | 0.034 parts |
| Disodium hydrogen phosphate | 0.166 parts |
| Water | 79.8 parts |

A reactive dye ink (Test liquid 2) was prepared by adjusting the dye liquid mentioned above to pH8.5 with a 10% aqueous solution of sodium carbonate.

(Evaluating of Laminated Examples)

Each of laminated samples obtained above was immersed in each of the test liquid 1 and the test liquid 2 kept at 60° C. and left for 50 days.

After 50 days of immersion treatment, each of laminated samples was washed with pure water and dried. For each of laminated samples, the presence or absence of peeling at the interface between the nozzle plate substrate and the resin layer in 1000 nozzles was confirmed, and the adhesion resistance between the nozzle plate substrate and the resin layer for the test liquid 1 and the test liquid 2 was evaluated according to the following criteria.

<Evaluation Criteria>

⊚(double circle): No peeling occurred in all 1000 nozzles.

○(circle): Extremely weak peeling is observed at 1 or more and less than 5% of nozzles, but there is no practical issue.

Δ(triangle): Weak peeling is observed at 5% or more and less than 10% of nozzles and is practically acceptable.

x (cross mark): There are nozzles with obvious peeling, which is of practical concern.

TABLE 4

TABLE IV

| | TEST LIQUID 1 | TEST LIQUID 2 |
|---|---|---|
| EXAMPLE 1 | ⊚ | ⊚ |
| EXAMPLE 2 | ○ | ○ |
| EXAMPLE 3 | ⊚ | ⊚ |
| COMPARATIVE EXAMPLE 1 | Δ | X |

INDUSTRIAL APPLICABILITY

According to the present invention, it can provide an ink ejection device with long-term reliability because of an excellent ink resistance at the interface between a resin layer disposed between base materials or on a base material, and the base material.

DESCRIPTION OF REFERENCE NUMERALS

100: ink ejection device
10A, 10B: head chip
1A, 1B: pressure chamber substrate
11, 11A, 11B: driving channel (second ink flow path)
12A, 12B: dummy channel
13: driving wall
14: driving electrode
2, 2A, 2B: adhesive layer
3A, 3B: flow path substrate
31: junction region
32, 32A, 32B: through-hole (first ink flow path)
33A, 33B: wiring electrode
34: insulating film
3*a*: wiring board
3*b*: spacer plate
3*d*: adhesive layer
3*v*: diaphragm
3*e*: upper electrode (driving electrode)
3*f*: lower electrode (driving electrode)
3P: piezoelectric body
3S: space
E: wiring conductor
4: protective film
5: manifold
6: chassis
7: cover member
8: flexible substrate
20: nozzle plate
21, 21A, 21B: nozzle

The invention claimed is:

1. An ink ejection device comprising a base material, a resin layer having at least one principal surface laminated to the base material to be in contact with the base material, and an ink flow path disposed such that an ink flows in contact with a part of the resin layer, wherein the resin layer contains carbon, oxygen, nitrogen and silicon, and the principal surface satisfies the following requirements (1) and (2):

(1) the principal surface is in contact with the base material, (2) if an atomic concentration (atm %) of nitrogen, oxygen and silicon in the principal surface of the resin layer measured by X-ray photoelectron spectroscopy is represented by a principal surface N, a principal surface O and a principal surface Si, and an atomic concentration (atm %) of nitrogen, oxygen and silicon in an interior of the resin layer is represented by an interior N, an interior O and an interior Si, the principal surface O>the interior O and the principal surface N>0, and a ratio of the principal surface Si to the interior Si represented by the principal surface Si/the interior Si is 5 or more.

2. The ink ejection device according to claim 1, wherein the principal surface satisfying the requirements (1) and (2) further satisfies the requirements (3):

(3) a ratio of the principal surface N to the interior N represented by the principal surface N/the interior N is 1.5 or more.

3. The ink ejection device according to claim 1, wherein a spectrum obtained by analyzing a binding state of nitrogen atoms by X-ray photoelectron spectroscopy on the principal surface satisfying the requirements (1) and (2) has a peak of $—NH_2$ or $—NH_3^+$.

4. The ink ejection device according to claim 1, wherein the resin layer is a cured product of a resin composition containing an epoxy compound, a curing agent having a pka of a $H^+$ adduct at 25° C. of 3 or more, and an amino-based silane coupling agent.

5. The ink ejection device according to claim 4, wherein the curing agent is a nitrogen-containing catalytic curing agent.

6. The ink ejection device according to claim 4, wherein the content of the curing agent relative to the total amount of the resin composition is in the range of 3 to 15% by mass.

7. The ink ejection device according to claim 4, wherein a molecular weight per one nitrogen atom of the amino-based silane coupling agent is 250 or less.

8. The ink ejection device according to claim 4, wherein the amino-based silane coupling agent has 2 or more alkoxy groups bound to silicon atoms.

9. The ink ejection device according to claim 1, wherein a material constituting the base material which is in contact with the principal surface satisfying the requirements (1) and (2) contains a metal, a metal oxide, or a glass.

10. The ink ejection device according to claim 1, wherein the ink contains a compound having at least one kind of groups selected from a carboxylic acid group, a sulfonic acid group and a phosphonic acid group, or at least one kind of anions selected from $SO_4^{2-}$, $PO_4^{3-}$, $B(C_6F_5)_4^-$, $SbF_6^-$, $PF_6^-$, $BF_4^-$, $CF_3SO_3^-$ and $C_4F_9SO_3^-$.

* * * * *